(12) United States Patent
Patel et al.

(10) Patent No.: US 9,140,833 B2
(45) Date of Patent: *Sep. 22, 2015

(54) RETROREFLECTIVE SHEETING INCLUDING A LOW REFRACTIVE INDEX LAYER HAVING A PLURALITY OF VOIDS

(75) Inventors: Suman K. Patel, Woodbury, MN (US); William D. Coggio, Hudson, WI (US); Mikhail L. Pekurovsky, Bloomington, MN (US); Kenneth L. Smith, White Bear Lake, MN (US); Michael Benton Free, St. Paul, MN (US); William B. Kolb, West Lakeland, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 705 days.

This patent is subject to a terminal disclaimer.

(21) Appl. No.: 13/264,436

(22) PCT Filed: Apr. 15, 2010

(86) PCT No.: PCT/US2010/031276
§ 371 (c)(1),
(2), (4) Date: Oct. 14, 2011

(87) PCT Pub. No.: WO2010/121054
PCT Pub. Date: Oct. 21, 2010

(65) Prior Publication Data
US 2012/0038984 A1 Feb. 16, 2012

Related U.S. Application Data

(60) Provisional application No. 61/169,532, filed on Apr. 15, 2009, provisional application No. 61/169,549, filed on Apr. 15, 2009, provisional application No. 61/324,249, filed on Apr. 14, 2010.

(51) Int. Cl.
*G02B 5/124* (2006.01)
*B32B 3/00* (2006.01)

(52) U.S. Cl.
CPC .. *G02B 5/124* (2013.01); *B32B 3/00* (2013.01)

(58) Field of Classification Search
CPC ........ G02B 5/124; G02B 5/128; G02B 5/122; G02B 5/12; G02B 5/126
USPC .......... 359/529–542; 428/156, 163, 167, 172, 428/174
See application file for complete search history.

(56) References Cited

U.S. PATENT DOCUMENTS 3,712,706 A 1/1973 Stamm
4,588,258 A 5/1986 Hoopman
(Continued)

FOREIGN PATENT DOCUMENTS

JP 6186408 7/1994
WO WO 2010/120422 10/2010
(Continued)

OTHER PUBLICATIONS

"3M Reflectivity How we see", Jan. 1, 2004, pp. 1-2.
(Continued)

*Primary Examiner* — James Phan

(57) ABSTRACT

Retroreflective articles and constructions are disclosed. One exemplary retroreflective article or construction includes a retroreflective layer and a low refractive index layer. In one exemplary embodiment, the low refractive index layer is adjacent to at least a portion of a retroreflective structured major surface of the retroreflective layer.

16 Claims, 6 Drawing Sheets

(56) References Cited

U.S. PATENT DOCUMENTS

| | | | |
|---|---|---|---|
| 4,775,219 | A | 10/1988 | Appeldorn |
| 5,691,846 | A | 11/1997 | Benson, Jr. |
| 5,804,610 | A | 9/1998 | Hamer |
| 6,132,861 | A | 10/2000 | Kang |
| 6,355,759 | B1 | 3/2002 | Sherman |
| 6,376,590 | B2 | 4/2002 | Kolb |
| 6,843,571 | B2 | 1/2005 | Sewall |
| 6,884,371 | B2 | 4/2005 | Smith |
| 6,917,400 | B2 | 7/2005 | Nakamura |
| 6,967,053 | B1 | 11/2005 | Mullen |
| 7,241,437 | B2 | 7/2007 | Davidson |
| 7,293,884 | B2 | 11/2007 | Sawayama |
| 7,422,334 | B2 | 9/2008 | Smith |
| 7,898,710 | B1 | 3/2011 | Scaggs |
| 7,980,710 | B2 | 7/2011 | Hayashi |
| 8,371,703 | B2 | 2/2013 | Smith |
| 8,746,902 | B2 * | 6/2014 | Patel et al. ............ 359/529 |
| 2004/0013856 | A1 | 1/2004 | Araki |
| 2007/0121211 | A1 | 5/2007 | Watanabe |
| 2011/0182076 | A1 * | 7/2011 | Sherman et al. ......... 362/297 |

FOREIGN PATENT DOCUMENTS

| | | |
|---|---|---|
| WO | WO 2010/120468 | 10/2010 |
| WO | WO 2010/120864 | 10/2010 |
| WO | WO 2010/121019 | 10/2010 |
| WO | WO 2010/121056 | 10/2010 |
| WO | WO 2011/050232 | 4/2011 |
| WO | WO 2011/129831 | 10/2011 |
| WO | WO 2011/129832 | 10/2011 |
| WO | WO 2011/129833 | 10/2011 |

OTHER PUBLICATIONS

1507 Extended EP Search Report for EP 10765199, PCT/ US2010/031276, dated Nov. 6, 2012, 7 pages.

Brunauer, "Adsorption of gasses in multimolecular layers", Journal of American Chemistry Society, Feb. 1938, vol. 60, No. 2, pp. 309-319.

Groh, "What Is the Lowest Refractive Index of an Organic Polymer?" Macromolecules, 1991, vol. 24, pp. 6660-6663.

International Search Report for PCT International Application No. PCT/US2010/031276, mailed on Jun. 18, 210, 2 pages.

Patton, "Paint Flow and Pigment Dispersion", $2^{nd}$ Edition, J. Wiley Interscience, 1978, Chapter 5, pp. 126-160.

Sudduth, "Modeling Cluster Voids and Pigment Distribution to Predict Properties and CPVC in Coatings. Part 1: Dry Coating Analysis", Pigment and Resin Technology, 2008, vol. 37, No. 6, pp. 375-388.

Yoder, "Study of Light Deviation Errors in Triple Mirrors and Tetrahedral Prisms", Journal of the Optical Society of America, 1958, vol. 48, No. 7, pp. 496-498.

* cited by examiner

RETROREFLECTIVE SHEETING INCLUDING A LOW REFRACTIVE INDEX LAYER HAVING A PLURALITY OF VOIDS

CROSS REFERENCE TO RELATED APPLICATIONS

This application is a national stage filing under 35 U.S.C. 371 of PCT/US2010/031276, filed Apr. 15, 2010, which claims priority to and benefit of U.S. Patent Application No. 61/324,249, filed Apr. 14, 2010, and U.S. Patent Application No. 61/169,532, filed Apr. 15, 2009, and U.S. Patent Application No. 61/169,549, filed Apr. 15, 2009 the disclosures of which are incorporated by reference in their entirety herein.

TECHNICAL FIELD

This disclosure generally relates to retroreflective articles that include a low-index coating and methods of making such articles. This disclosure further relates to retroreflective articles that exhibit low-index like properties and methods of making such articles.

BACKGROUND

Retroreflective materials are characterized by the ability to redirect light incident on the material back toward the originating light source. This property has led to the widespread use of retroreflective sheeting for a variety of traffic and personal safety uses. Retroreflective sheeting is commonly employed in a variety of articles, for example, road signs, barricades, license plates, pavement markers and marking tape, as well as retroreflective tapes for vehicles and clothing.

Two known types of retroreflective sheeting are cube corner sheeting and microsphere-based sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Cube corner retroreflective sheeting, sometimes referred to as "prismatic" sheeting, typically comprises a thin transparent layer having a substantially planar first surface and a second structured surface comprising a plurality of geometric structures, some or all of which include three reflective faces configured as a cube corner element.

Typically, a cube corner element includes three mutually perpendicular optical faces that intersect at a single apex. Generally, light that is incident on a corner cube element from a light source is totally internally reflected from each of the three perpendicular cube corner optical faces and is redirected back toward the light source. Presence of, for example, dirt, water and adhesive on the optical faces can prevent total internal reflection (TIR) and lead to a reduction in the retroreflected light intensity. As such, the air interface is typically protected by a sealing film. Metallized cube corners do not rely on TIR for retroreflective light, but they are typically not white enough for daytime viewing of, for example, signing applications. Furthermore, the durability of the metal coatings may also be inadequate.

SUMMARY

The present disclosure relates generally to a retroreflective article including a retroreflective layer including a first major surface that is structured and an opposed second major surface; and a low refractive index material adjacent to at least a portion of the structured major surface, the low refractive index material having an effective index of refraction that is less than about 1.3.

The present disclosure also generally relates to a retroreflective article including a retroreflective layer including a first major surface that is structured and an opposed second major surface; and a low refractive index layer on at least a portion of the structured major surface, the low refractive index layer including a binder, a plurality of particles, and a plurality of voids.

The present disclosure also generally relates to a retroreflective article including a retroreflective layer including a first major surface that is structured and an opposed second major surface; and a low refractive index layer on at least a portion of the structured major surface, the low refractive index layer including a binder and a plurality of voids.

BRIEF DESCRIPTION OF DRAWINGS

The present disclosure may be more completely understood and appreciated in consideration of the following detailed description of various embodiments in connection with the accompanying drawings, in which.

In the specification, a same reference numeral used in multiple figures refers to the same or similar elements having the same or similar properties and functionalities.

DETAILED DESCRIPTION

Figure 1A:
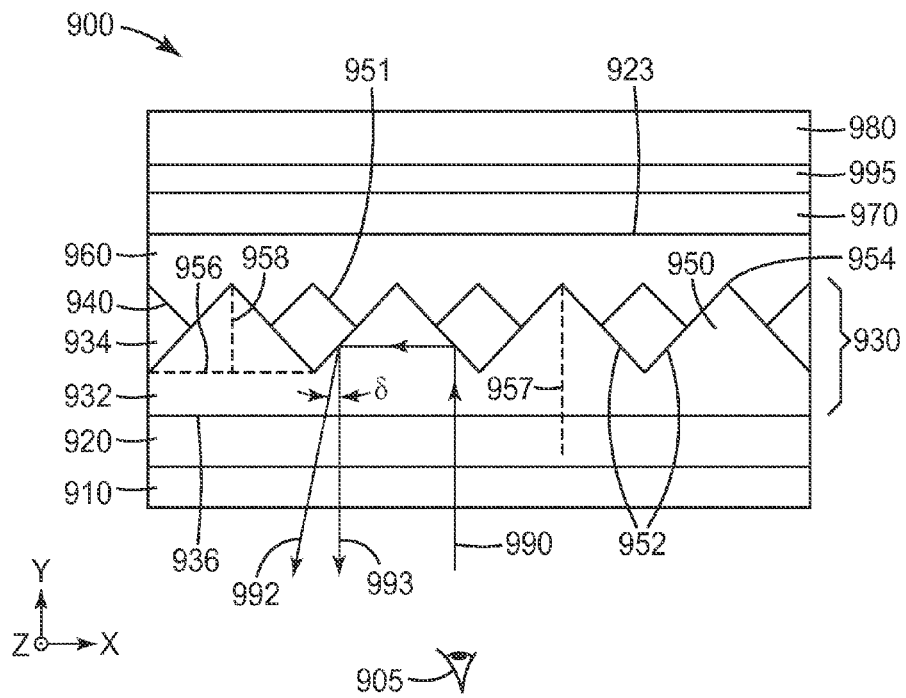
FIG. 1A is a schematic side view of a retroreflective optical construction.

This disclosure generally relates to retroreflective and/or retroreflecting articles and constructions that include at least one layer having a low-index of refraction or that exhibit some low-index-like optical properties. For purposes of the present disclosure, low refractive index is a refractive index of 1.3 or lower. Some embodiments of such retroreflective articles or constructions include one or more low refractive index layers or materials. In some embodiments, the low refractive index layers or materials have low optical haze or diffuse reflectance. Some embodiments include a low refractive index layer or material having an effective index of refraction that is less than about 1.3. Retroreflective and/or retroreflecting articles and constructions and/or optical layers or films including a low refractive index layer or materials can efficiently support or maintain total internal reflection. Further, the low refractive index layers or materials of the present disclosure efficiently support or maintain total internal reflection.

Some embodiments of the retroreflective articles or constructions of the present disclosure include one or more optical films or low refractive index layers that have a high optical haze or diffuse reflectance while manifesting some low-index-like optical properties, such as, for example, the ability to support total internal reflection or enhance internal reflection. A retroreflective article or construction that includes a diffusive optical film can have a white appearance, a potentially desirable attribute especially in daylight viewing, while at the same time, retroreflecting incident light with high efficiency.

Some embodiments of the retroreflective articles or constructions of the present disclosure include one or more optical films or low refractive index layers that support total internal reflection (TIR) or enhanced internal reflection (EIR) by virtue of including a plurality of voids. When light that travels in an optically clear non-porous medium is incident on a stratum possessing high porosity, the reflectivity of the incident light is much higher at oblique angles than at normal incidence. In the case of no or low haze voided films, the reflectivity at oblique angles greater than the critical angle is close to about 100%. In such embodiments, the incident light undergoes TIR. In the case of high haze voided films, the oblique angle reflectivity can be close to 100% over a similar range of incident angles even though the light may not undergo TIR. This enhanced reflectivity for high haze films is similar to TIR and is designated as EIR. As used herein, by a porous or voided optical film or low refractive index layer EIR, it is meant that the reflectance at the boundary of the voided and non-voided strata of the film or film laminate or layer is greater with the voids than without the voids.

Some embodiments of the retroreflective articles or constructions of the present disclosure include one or more optical films or low refractive index layers that include a plurality of voids dispersed in a binder. The voids have an index of refraction $n_v$ and a permittivity $\epsilon_v$, where $n_v^2=\epsilon_v$, and the binder has an index of refraction $n_b$ and a permittivity $\epsilon_b$, where $n_b^2=\epsilon_b$. In general, the interaction of an optical film or low refractive index layer with light, such as light that is incident on, or propagates in, the optical film or low refractive index layer, depends on a number of film or layer characteristics such as, for example, the film or layer thickness, the binder index, the void or pore index, the pore shape and size, the spatial distribution of the pores, and the wavelength of light. In some embodiments, light that is incident on or propagates within the optical film or low refractive index layer, "sees" or "experiences" an effective permittivity $\epsilon_{eff}$ and an effective index $n_{eff}$, where $n_{eff}$ can be expressed in terms of the void index $n_v$, the binder index $n_b$, and the void porosity or volume fraction "f". In such embodiments, the optical film or low refractive index layer is sufficiently thick and the voids are sufficiently small so that light cannot resolve the shape and features of a single or isolated void. In such embodiments, the size of at least a majority of the voids, such as at least 60% or 70% or 80% or 90% of the voids, is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light. In some embodiments, some of the voids can be sufficiently small so that their primary optical effect is to reduce the effective index, while some other voids can reduce the effective index and scatter light, while still some other voids can be sufficiently large so that their primary optical effect is to scatter light.

In some embodiments, the light that is incident on an optical film or low refractive index layer is visible light, meaning that the wavelength of the light is in the visible range of the electromagnetic spectrum. In such embodiments, the visible light has a wavelength that is in a range of from about 380 nm to about 750 nm, or from about 400 nm to about 700 nm, or from about 420 nm to about 680 nm. In such embodiments, the optical film or low refractive index layer has an effective index of refraction and includes a plurality of voids if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

In some embodiments, the optical film or low refractive index layer is sufficiently thick so that the optical film or low refractive index layer has an effective index that can be expressed in terms of the indices of refraction of the voids and the binder, and the void or pore volume fraction or porosity. In such embodiments, the thickness of the optical film or low refractive index layer is not less than about 100 nm, or not less than about 200 nm, or not less than about 500 nm, or not less than about 700 nm, or not less than about 1,000 nm.

When the voids in a disclosed optical film or low refractive index layer are sufficiently small and the optical film or low refractive index layer is sufficiently thick, the optical film or low refractive index layer has an effective permittivity $\epsilon_{eff}$ that can be expressed as:

$$\epsilon_{eff}=f\epsilon_v+(1-f)\epsilon_b \quad (1)$$

In such embodiments, the effective index $n_{eff}$ of the optical film or low refractive index layer can be expressed as:

$$n_{eff}^2=fn_v^2+(1-f)n_b^2 \quad (2)$$

In some embodiments, such as when the difference between the indices of refraction of the pores and the binder is sufficiently small, the effective index of the optical film or low refractive index layer can be approximated by the following expression:

$$n_{eff}=fn_v+(1-f)n_b \quad (3)$$

In such embodiments, the effective index of the optical film or low refractive index layer is the volume weighted average of the indices of refraction of the voids and the binder. Under ambient conditions, the voids contain air, and thus the refractive index $n_v$ for the voids is approximately 1.00. For example, an optical film or low refractive index layer that has a void volume fraction of about 50% and a binder that has an index of refraction of about 1.5, has an effective index of about 1.25.

FIG. 1A is a schematic side view of a retroreflective optical construction or article 900. Retroreflective article 900 includes a retroreflective layer 930 that includes a front major surface 936 facing a viewer 905 and a retroreflective structured major surface 940 opposite front major surface 936. Retroreflective article 900 also includes a low refractive index layer 960 disposed on or adjacent to retroreflective major surface 940, an optical adhesive layer 970 disposed on or adjacent to low refractive index layer 960, an optically diffusive layer 995 disposed on or adjacent to optical adhesive layer 970, and a first substrate 980 disposed on or adjacent to optical adhesive layer 970. Retroreflective article 900 further includes an optically transparent second substrate 920 disposed on or adjacent to front major surface 936 of retroreflective layer 930 and a graphics layer 910 disposed on or adjacent to transparent second substrate 920. Retroreflective layer 930 includes a retroreflective portion 934 that includes a plurality or an array of retroreflective optical elements 950 and a land portion 932 that connects optical elements 950.

In embodiments where retroreflective article 900 is intended to be substantially flexible, retroreflective article 900 may not include a land portion or land layer. In such embodiments, the retroreflective optical elements are not connected to each other through a land portion and can be directly formed on, for example, substrate 920. The use of discrete unconnected optical elements 950 can increase the flexibility of retroreflective article 900 because each optical element 950 can move independently of the other optical elements 950.

Figure 1B:
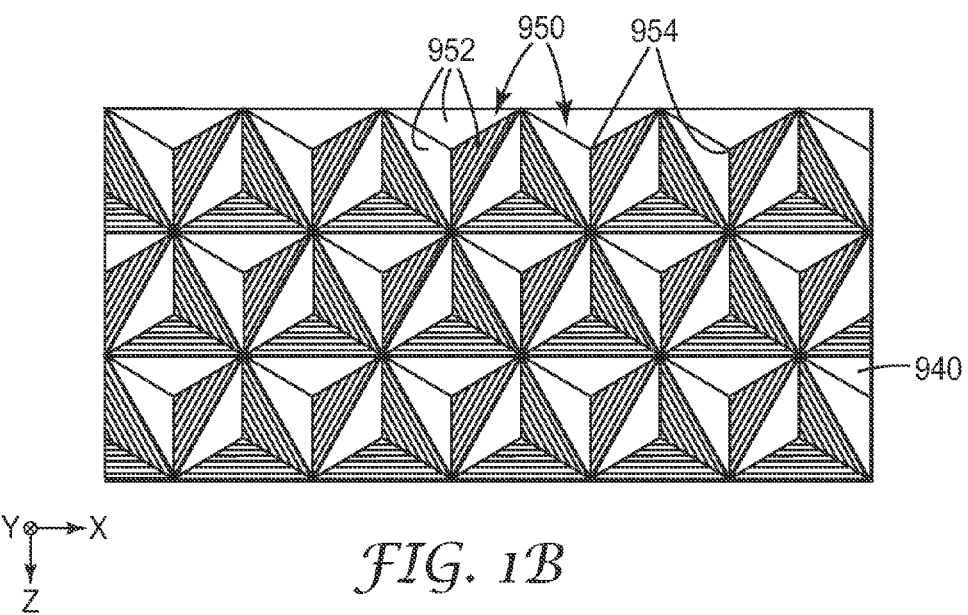
FIG. 1B is a schematic top-view of a retroreflective layer.

FIG. 1B is a schematic top-view of retroreflective layer 930. In some embodiments, such as in the exemplary retroreflective article 900, each retroreflective optical element 950 is in the form of a tetrahedron or a pyramid, such as a regular tetrahedron or pyramid, having three planar facets or sides 952 and a base 956, where the sides meet at an apex 954. However, optical elements 950 can be of any shape that provides efficient reflection or retroreflection. The dihedral angle between any two facets 952 may vary depending on the properties desired. In some embodiments, the dihedral angle between any two facets 952 is 90 degrees. In such embodiments, facets 952 are substantially perpendicular to one another (as in the corner of a room) and the optical element may be referred to as a cube corner element. In some embodiments, the dihedral angle between adjacent facets 952 can deviate from 90° as described, for example, in U.S. Pat. No. 4,775,219, the disclosure of which is incorporated in its entirety herein by reference. In some embodiments, optical elements 950 can be truncated cube corners. In some embodiments, optical elements 950 can be full cubes or preferred geometry (PG) cubes as described in, for example, U.S. Pat. No. 7,422,334, the disclosure of which is incorporated in its entirety herein by reference. Each retroreflective optical element 950 includes a symmetry axis 957 that makes equal angles with facets 952. In some embodiments, such as in the exemplary construction 900, symmetry axis 957 is perpendicular to base 956 or front surface 936. In some alternative embodiments, the symmetry axis is not perpendicular to the base or the front surface. In such embodiments, apex 954 or optical element 950 may be canted as described, for example, in U.S. Pat. No. 4,588,258, the disclosure of which is incorporated in its entirety herein by reference. Apex 954 can also be referred to as an optical element tip.

The principle operation of a retroreflective cube corner is well known and is described, for example, in J. Optical Soc. of America 46(7), 496 (1958). In sum, a light ray 990 propagating along the positive y-direction and incident on a retroreflective optical element 950, is TIR by each of facets 952 of the optical element resulting in a retroreflected light ray 993 propagating along the negative y-direction and parallel to incident light ray 990. In some embodiments, the retroreflected light ray deviates from the y-direction as retroreflected light ray 992 making a divergence angle δ with the y-axis. In some embodiments, such as in the case of a road sign, the divergence angle δ is in a range from about 0.2 degrees to about 2 degrees. Any breakdown of TIR can substantially reduce the intensity of retroreflected light ray 993.

The coefficient of retroreflection $R_A$, sometimes referred to as the retroreflectivity, of retroreflective article 900 can vary depending on the properties desired in a specific application. In some embodiments, $R_A$ meets the ASTM D4956-07e1 standards at 0 degree and 90 degree orientation angles. In some embodiments, $R_A$ is in a range from about 5 cd/(lux·m$^2$) to about 1500 cd/(lux·m$^2$) when measured at 0.2 degree observation angle and +5 degree entrance angle according to ASTM E-810 test method or CIE 54.2; 2001 test method. In some embodiments, such as in embodiments where retroreflective article 900 is used in a traffic control sign, a delineator, or a barricade, $R_A$ is at least about 330 cd/(lux·m$^2$), or at least about 500 cd/(lux·m$^2$), or at least about 700 cd/(lux·m$^2$) as measured according to ASTM E-810 test method or CIE 54.2; 2001 test method at 0.2 degree observation angle and +5 degree entrance angle. In some embodiments, the retroreflective structured major surface exhibits a coefficient of retroreflection $R_A$ that is not less than (or is greater than) about 40 cd/(lux·m$^2$), or greater than about 100 cd/(lux·m$^2$), or greater than about 150 cd/(lux·m$^2$), or greater than about 200 cd/(lux·m$^2$), or greater than about 250 cd/(lux·m$^2$), or greater than about 300 cd/(lux·m$^2$), or greater than about 350 cd/(lux·m$^2$), or greater than about 400 cd/(lux·m$^2$), for an observation angle of about 0.2 degrees and an entrance angle of about −4 degrees.

In some embodiments, such as in motor vehicle related application, $R_A$ is at least about 60 cd/(lux·m$^2$), or at least about 80 cd/(lux·m$^2$), or at least about 100 cd/(lux·m$^2$) as measured according to ASTM E-810 test method or CIE 54.2; 2001 test method at 0.2 degree observation angle and +5 degree entrance angle.

Total light return (TLR) for retroreflective article 900 can be determined from a knowledge of percent active area and ray intensity. Ray intensity can be reduced by front surface losses and by reflection from each of the three cube corner surfaces for a retroreflected ray. Total light return is defined as the product of percent active area and ray intensity, or a percentage of the total incident light which is retroreflected. A discussion of total light return for directly machined cube corner arrays is described in, for example, U.S. Pat. No. 3,712,706 (Stamm), which is herein incorporated by reference in its entirety. The total light return is further described in Provisional U.S. Patent Application No. 61/107,586, filed Oct. 22, 2008, incorporated herein by reference in its entirety. In some embodiments, the retroreflective surface exhibits a total light return that is not less than (or that is greater than) about 5%, or greater than about 10%, or greater than about 15%, or greater than about 20%, or greater than about 25%, or greater than about 30%, for incident visible light at an entrance angle of about −4 degrees.

Adhesive layer 970 adheres low refractive index layer 960 to optically diffusive layer 995. In some embodiments, adhesive layer 970 is substantially optically diffusive and can have a white appearance. For example, in some embodiments, the optical haze of an optically diffusive adhesive layer 970 is not less than (or is greater than) about 30%, or greater than about 40%, or greater than about 50%, or greater than about 60%, or greater than about 70%, or greater than about 80%, or greater than about 90%, or greater than about 95%. In some embodiments, the diffuse reflectance of an diffusive adhesive layer is not less than (or is greater than) about 20%, or greater than about 30%, or greater than about 40%, or greater than about 50%, or greater than about 60%. In at least some of these embodiments, the optically diffusive adhesive layer is made optically diffusive by dispersing into the optical adhesive particles having an index of refraction that differs from the index of refraction of the optical adhesive. The mismatch between the two indices of refraction causes incident light to scatter. In embodiments where adhesive layer 970 is optically diffusive, retroreflective article 900 may not include the optically diffusive layer 995. As such, optically diffusive layer 995 is optional.

Adhesive layer 970 can be any adhesive that is desirable and/or available. Exemplary adhesives include pressure sensitive adhesives (PSAs), heat-sensitive adhesives, solventless adhesives, and UV-curable adhesives such as UV-curable optical adhesives available from Norland Products, Inc. Useful commercially available adhesives include, for example, 8141, 8142 Optically Clear Adhesive available from 3M Company of St. Paul, Minn. Exemplary PSAs include those based on natural rubbers, synthetic rubbers, styrene block copolymers, (meth)acrylic block copolymers, polyvinyl ethers, polyolefins, and poly(meth)acrylates. As used herein, (meth)acrylic (or acrylate) refers to both acrylic and methacrylic species. Other exemplary PSAs include (meth)acrylates, rubbers, thermoplastic elastomers, silicones, urethanes, and combinations thereof. In some embodiments, the PSA is based on a (meth)acrylic PSA or at least one poly(meth) acrylate. Exemplary silicone PSAs include a polymer or gum and an optional tackifying resin. Other exemplary silicone PSAs include a polydiorganosiloxane polyoxamide and an optional tackifier. In some embodiments, adhesive layer 970 includes cross-linked tackified acrylic pressure sensitive adhesives. Adhesive layer 970 can also include additives such as tackifiers, plasticizers and fillers (such as pigments such as $TiO_2$). In some embodiments, $TiO_2$ can be added to the adhesive layer to give it a white appearance.

Optically diffusive layer 995 diffuses incident light and can give a white appearance to retroreflective article 900 in, for example, daylight conditions, which may be deemed advantageous in some embodiments. Optically diffusive layer 995 can be any optically diffusive layer that is desirable and/or available. For example, the optically diffusive layer can include a plurality of particles dispersed in a binder where the particles and the binder have different indices of refraction. In some embodiments, such as when optically diffusive layer 995 is sufficiently diffusive to impart a white look to retroreflective article 900, the optically diffusive layer has an optical haze that is not less than (or greater than) about 40%, or greater than about 50%, or greater than about 60%, or greater than about 70%, or greater than about 80%, or greater than about 90%, or greater than about 95%. As described above, in some embodiments, optically diffusive layer 995 can be an adhesive. In some embodiments, optically diffusive layer 995 can provide sufficient adhesion to eliminate the need for a separate adhesive layer 970.

Graphics layer 910 is an optional layer and includes one or more graphic images for viewing by viewer 905 under suitable lighting conditions, such as daytime lighting conditions. A graphic image can be a colored image and can be optically transmissive for all the colors included in the image. Alternatively, the graphics layer can be more optically transmissive for brighter colors and less optically transmissive for darker colors. In some embodiments, the optical transmittance of the graphics layer for any color included in the layer is at least 5%, or at least 7%, or at least 10%. Graphics layer 910 can be formed by any suitable method, such as any suitable printing or coating method, and can include different colorants, such as different dyes or pigments, appropriately dispersed in a binder. In the exemplary retroreflective article 900, graphics layer 910 is disposed on the front of the construction. In general, the graphics layer, if included, can be disposed in any desirable location. For example, in some embodiments, the graphics layer can be disposed between layers 920 and 930.

Low refractive index layer 960 can be any optical layer that promotes or maintains TIR or enhances internal reflection at the interface with retroreflective layer 930. Low refractive index layer 960 has a sufficiently low index of refraction so as to maintain or support TIR resulting in efficient retroreflection by retroreflective layer 930. Low refractive index layer 960 can be made of any material that supports these goals. In some embodiments, the effective index of refraction of low refractive index layer 960 is not greater than (or is less than) about 1.3, or less than about 1.25, or less than about 1.2, or less than about 1.15, or less than about 1.1. In some embodiments, the refractive index is between about 1.14 and about 1.30. Some embodiments of the low index refractive layer are preferably sufficiently porous to promote or maintain TIR or enhance internal reflection. In some embodiments, low refractive index layer 960 includes a binder, a plurality of particles, and a plurality of interconnected voids or a network of interconnected voids. In other embodiments, low refractive index layer 960 includes a binder and a plurality of interconnected voids or a network of interconnected voids.

A plurality of interconnected voids or a network of interconnected voids can occur by one of two main methods as disclosed herein. In one process, the inherent porosity of highly structured, high surface area fumed metal oxides, such as fumed silica oxides, is exploited in a mixture of binder to form a composite structure that combines binder, particles, voids and optionally crosslinkers or other adjuvant materials. In another process, voids are formed in-situ from a binder, crosslinker mixture and optionally a particle followed by curing. This process "gels" the components in a solvated state to form a saturated gel which results in an in-situ porosity formation when the gel is completely dried and crosslinked. The desirable binder to particle ratio is dependent upon the type of process used to form the interconnected voided structure.

While a binder resin is not a prerequisite for the porous fumed silica structure to form, it is typically desirable to incorporate some type of polymeric resin or binder in with the metal oxide network to improve the processing, coating quality, adhesion and durability of the final construction. Examples of useful binder resins are those derived from thermosetting, thermoplastic and UV curable polymers. Examples include polyvinylalcohol, (PVA), polyvinylbutyral (PVB), polyvinyl pyrrolidone (PVP), polyethylene vinly acetate copolymers (EVA), cellulose acetate butyrate (CAB) polyurethanes (PURs), polymethylmethacrylate (PMMA), polyacrylates, epoxies, silicones and fluoropolymers, Examples of commercially available binders useful in the mixtures are those available form Kuraray-USA, Wacker Chemical, Dyneon LLC. Although the binder can be a polymeric system, it can also be added as a polymerizable monomeric system, such as a UV, or thermally curable or crosslinkable system. Examples of such systems would be UV polymerizable acrylates, methacrylates, multi-functional acrylates, urethane-acrylates, and mixtures thereof. Some typical examples would be 1,6 hexane diol diacrylate, trimethylol propane triacrylates, pentaerythritol triacryalate. Such UV active systems are well known and readily available from such suppliers as Ato-Fina, or Sartomers.

The polymeric binders can also be formulated with cross linkers that can chemically bond with the polymeric binder to form a crosslinked network. Although the formation of crosslinks is not a prerequisite for the formation of the porous structure or the low refractive index optical properties, it is often desirable for other functional reasons such as to improve the cohesive strength of the coating, adhesion to the substrate or moisture, thermal and solvent resistance. The specific type of crosslinker is dependent upon the binder used. Typical crosslinkers for polymeric binders such as PVA would be diisocyanates, titantates such as TYZOR-LA™ (available from DuPont, Wilmington, Del.), boric acid, diepoxides diacids and the like.

The polymeric binders may form a separate phase with the particle aggregates or may be inter-dispersed between the particle aggregates in a manner to "bind" the aggregates together into a structures connecting with the metal oxidize particles through direct covalent bond formation or molecular interactions such as ionic, dipole, van Der Waals forces and physical entanglements with the metal oxides.

Exemplary particles include fumed metal oxides or pyrogenic metal oxides, such as, for example, a fumed silica or alumina. In some embodiments, particles that are highly branched or structured may be used. Such particles prevent efficient packing in the binder matrix and allow interstitial voids or pores to form. Exemplary materials including highly branched or structured particles include Cabo-Sil™ fumed silicas or silica dispersions, such as, for example, those sold under trade designations EH5, TS 520, or pre-dispersed fumed silica particles such as those available as Cabo-Sperse™ PG 001, PG 002, PG 022, 1020K, 1015. Fumed alumina oxides are also useful structured particles to form a low refractive index system although silica is preferred since it has an inherent by lower skeletal refractive index than alumina. Examples of alumina oxide are available under the trade name Cabo-Sperse, such as, for example, those sold under the trade designation Carbo-Sperse™ PG003 or Cabot Spec-Al™. Non-white particles can also be used, such as, for examples, certain dispersible carbon blacks, such as, for example, those available from Cabot under the trade name Vulcan™ XC72R. Non-white particles may have the added optical benefit of showing one color in transmission but being highly retroreflective. In some embodiments, aggregates of these exemplary fumed metal oxides comprise a plurality of primary particles in the range of about 8 nm to about 20 nm and form a highly branched structure with a wide distribution of sizes ranging from about 80 nm to greater than 300 nm. In some embodiments, these aggregates pack randomly in a unit volume of a coating to form a mesoporous structure with complex bi-continuous network of channels, tunnels, and pores which entrap air in the network and thus lower the density and refractive index of the coating.

Fumed silica particles can also be treated with a surface treatment agent. Surface-treatment of the metal oxide particles can provide, for example, improved dispersion in the polymeric binder, altered surface properties, enhanced particle-binder interactions, and/or reactivity. In some embodiments, the surface-treatment stabilizes the particles so that the particles are well dispersed in the binder, resulting in a substantially more homogeneous composition. The incorporation of surface modified inorganic particles can be tailored, for example, to enhance covalent bonding of the particles to the binder and to thereby provide a more durable and more homogeneous polymer/particle network.

The preferred type of treatment agent is determined, in part, by the chemical nature of the metal oxide surface. Silanes are preferred for silica and other for siliceous fillers. In the case of silanes, it may be preferred to react the silanes with the particle surface before incorporation into the binder. The required amount of surface modifier is dependant upon several factors such as, for example, particle size, particle type, modifier molecular weight, and/or modifier type. The silane modifier can have reactive groups that form covalent bonds between particles and the binder such as, for example, carboxy, alcohol, isocynanate, acryloxy, epoxy, thiol or amines. Conversely, the silane modifier can have non-reactive groups, such as, for example, alkyl, alkloxy, phenyl, phenyloxy, polyethers, or mixtures thereof. Such non-reactive groups may modify the surface of the coatings to improve, for example, soil and dirt resistance or to improve static dissipation. Commercially available examples of a surface modified silica particle include, for example, Cabo-Sil™ TS 720 and TS 530. It may sometimes be desirable to incorporate a mixture of functional and non-function groups on the surface of the particles to obtain a combination of these desirable features.

Representative embodiments of surface treatment agents suitable for use in the compositions of the present disclosure include, for example, N-(3-triethoxysilylpropyl) methoxyethoxyethoxyethyl carbamate, N-(3-triethoxysilylpropyl) methoxyethoxyethoxyethyl carbamate, 3-(methacryloyloxy) propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl) methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy)acetic acid, methoxyphenyl acetic acid, and mixtures thereof.

Particle volume concentration (PVC) and critical particle volume concentration (CPVC) can be used to characterize the porosity of a coating. The terms PVC and CPVC are well defined terms in the paint and pigment literature and are further defined well referenced articles and technical books, such as, for example "*Paint Flow and Pigment Dispersion*", Patton, T. C., $2^{nd}$ Edition, J. Wiley Intersceince, 1978, Chapter 5, p. 126 and "*Modeling Cluster Voids and Pigment Distribution to Predict Properties and CPVC in Coatings. Part 1: Dry Coating Analysis*" and Sudduth, R. D; *Pigment and Resin Technology*, 2008, 37(6). p. 375.) When the volume concentration of the particles is larger than CPVC, the coating is porous since there is not enough binder to fill all the gaps between the particles and the interstitial regions of the coating. The coating then becomes a mixture of binder, particles, and voids. The volume concentration at which this occurs is related to particle size and particle structure and/or shape. Formulations with volume concentrations above CPVC have a volume deficiency of resin in the mixture that is replaced by air. The relationship between CPVC, PVC and porosity is:

$$\text{Porosity} = 1 - \frac{CPVC}{PVC}$$

As used in this discussion of CPVC, the term "pigment" is equivalent to particles and the term "resin" is equivalent to binder. In certain binder-particle systems, when the volume concentration of the particles exceeds a critical value known, as the CPVC, the mixture becomes porous. Thus the coating becomes essentially a mixture of binder, particles, and air, because there is insufficient binder to fill all the gaps between the particles and the interstitial regions of the coating. When this occurs, the volume concentration is related to at least one of the pigment particle size distribution, wetting, and the particle structure or shape. Materials that provide desired low refractive index properties have submicron pores derived from particle-binder mixtures that are highly structured and formulated above their CPVC. In some embodiments, retroreflective articles have CPVC values that are not greater than (or are less than) about 60%, or less than about 50%, or less than about 40%.

As described above, particles that are highly branched or structured prevent efficient packing in the binder matrix and allow interstitial voids or pores to form. In contrast, material combinations which fall below the desired CPVC will not be sufficiently porous. The BET method (described above) may be helpful in determining CPVC and thus porosity of low index materials because the BET method analyzes pores which are less than 200 nm in diameter, less than 100 nm in diameter, or even less than 10 nm in diameter. BET data can assist in the characterization of materials that meet minimum requirements for forming a porous structure.

The volume concentration of the particles described by the PVC/CPVC relationship is also related to the weight concentration of the particles. Therefore it is possible to establish particle weight ranges that are above the CPVC. The use of weight ratio or weight percent is one way to formulate mixtures with the desirable CPVC values. For the retroreflective articles of the present disclosure, weight ratios of binder to particle from 1:1 to 1:8 are desirable. A weight ratio of 1:1 is the equivalent of about 50 wt% particle where as 1:8 is equivalent to about 89 wt % particle. Exemplary binder to metal oxide particle ratios are less than 1:2 (less than 33% binder), less than 1:3, less than 1:4, less than 1:5, less than 1:6, less than 1:7, less than 1:8, less than 1:9, and less than 1:10 (about 8-10% binder). The lower limit of binder may be dictated by the desired refractive index. The lower limit of binder may be dictated by the desired physical properties, e.g., processing or final durability characteristics. Thus the binder to particle ratio will vary depending on the desired end use and the desired retroreflective article properties.

Generally, in one process typically referred to herein as the "GEL" process, first a solution is prepared that includes a plurality of particles, such as nano-particles, and a polymerizable material dissolved in a solvent, where the polymerizable material can include, for example, one or more types of monomers. Next, the polymerizable material is polymerized, for example by applying heat or light, to form an insoluble polymer matrix in the solvent. As the polymerization occurs, the solvent solubility (in the cured matrix) decreases and can phase separate from the matrix. This results in a matrix-rich network and phase separated solvent-rich network. The solvent is subsequently removed leaving pores and voids which yield the porous coating. The extent and type of phase separation is a primary factor in determining the morphology and topography of the film. The final structure is also dependent on the mechanical properties of the matrix network. The network modulus and strength should be sufficient to maintain a void space as the solvent is removed. The composition and extent of cure are factors in determining the morphology.

Alternatively, the low refractive index layer can include a patterned low refractive index layer that has regions that include variations in refractive index, haze, transmission, clarity, or a combination thereof. In some embodiments, the low refractive index layer includes a binder and a plurality of nanovoids. In another embodiment, the optical construction includes a substrate and a low refractive index layer disposed on the substrate. The low refractive index layer includes a binder and a plurality of nanovoids. In yet another embodiment, the optical construction includes a substrate and a low refractive index layer disposed on the substrate. In yet another embodiment, the optical construction includes a low refractive index layer that includes disposing a solution on a substrate to form a coating, the coating including a polymerizable binder and a solvent; selectively polymerizing a first portion of the coating to form an insoluble polymer matrix in the solvent; removing a major portion of the solvent from the coating; and polymerizing a second portion of the coating adjacent the first portion.

Voids have a size $d_1$ that can generally be controlled by choosing suitable composition and fabrication techniques, such as the various coating, drying, and curing conditions. In general, $d_1$ can be any desired value in any desired range of values. For example, in some embodiments, at least a majority of the voids, such as at least 60% or 70% or 80% or 90% or 95% of the voids, have a size that is in a desired range. For example, in some embodiments, at least a majority of the voids, such as at least 60% or 70% or 80% or 90% or 95% of the voids, have a size that is not greater than about 10 microns, or not greater than about 7 microns, or not greater than about 5 microns, or not greater than about 4 microns, or not greater than about 3 microns, or not greater than about 2 microns, or not greater than about 1 micron, or not greater than about 0.7 microns, or not greater than about 0.5 microns. In some embodiments, a plurality of interconnected voids has an average void or pore size that is not greater than about 5 microns, or not greater than about 4 microns, or not greater than about 3 microns, or not greater than about 2 microns, or not greater than about 1 micron, or not greater than about 0.7 microns, or not greater than about 0.5 microns.

In some embodiments, the index of refraction $n_1$ of the particles can be sufficiently close to the index $n_b$ of binder, so that the effective index does not depend, or depends very little, on the index of refraction of the particles. In such embodiments, the difference between $n_1$ and $n_b$ is not greater than about 0.01, or not greater than about 0.007, or not greater than about 0.005, or not greater than about 0.003, or not greater than about 0.002, or not greater than about 0.001. In some embodiments, particles are sufficiently small and their index is sufficiently close to the index of the binder, that the particles do not primarily scatter light or affect the index. In such embodiments, the primary effect of the particles can, for example, be to enhance the strength of low refractive index layer. In some embodiments, particles can enhance the process of making the low refractive index layer, although low refractive index layer can be made with no particles.

In general, low refractive index layer can have any porosity, pore-size distribution, or void volume fraction that may be desirable in an application. In some embodiments, the volume fraction of plurality of the voids in the low refractive index layer is not less than about 20%, or not less than about 30%, or not less than about 40%, or not less than about 50%, or not less than about 60%, or not less than about 70%, or not less than about 80%, or not less than about 90%.

In some embodiments, portions of the low refractive index layer can manifest some low-index properties, even if the low refractive index layer has a high optical haze and/or diffuse reflectance. For example, in such embodiments, the portions of the low refractive index layer can support TIR at angles that correspond to an index that is smaller than the index $n_b$ of the binder.

In the exemplary low refractive index layer, the particles can be solid particles. In some embodiments, low refractive index layer may additionally or alternatively include a plurality of hollow or porous particles. The particles can be any type particles that may be desirable in an application. For example, the particles can be organic or inorganic particles. For example, the particles can be silica, zirconium oxide or alumina particles. The particles can have any shape that may be desirable or available in an application. For example, the particles can have a regular or irregular shape. For example, the particles can be approximately spherical. As another example, the particles can be elongated. In such embodiments, the low refractive index layer includes a plurality of elongated particles. In some embodiments, the elongated particles have an average aspect ratio that is not less than about 1.5, or not less than about 2, or not less than about 2.5, or not less than about 3, or not less than about 3.5, or not less than about 4, or not less than about 4.5, or not less than about 5. In some embodiments, the particles can be in the form or shape of a string-of-pearls (such as Snowtex-PS particles available from Nissan Chemical, Houston, Tex.) or aggregated chains of spherical or amorphous particles, such as fumed silica.

The particles may or may not be functionalized. In some embodiments, the particles are not functionalized. In some embodiments, the particles are functionalized so that they can be dispersed in a desired solvent or binder with no, or very little, clumping. In some embodiments, the particles can be further functionalized to chemically bond to the binder. For example, the particles can be surface modified and have reactive functionalities or groups to chemically bond to binder. In such embodiments, at least a significant fraction of the particles is chemically bound to the binder. In some embodiments, particles do not have reactive functionalities to chemically bond to the binder. In such embodiments, the particles can be physically bound to the binder, or the binder can encapsulate particles.

In some embodiments, some of the particles have reactive groups and others do not have reactive groups. For example in some embodiments, about 10% of the particles have reactive groups and about 90% of the particles do not have reactive groups, or about 15% of the particles have reactive groups and about 85% of the particles do not have reactive groups, or about 20% of the particles have reactive groups and about 80% of the particles do not have reactive groups, or about 25% of the particles have reactive groups and about 75% of the particles do not have reactive groups, or about 30% of the particles have reactive groups and about 60% of the particles do not have reactive groups, or about 35% of the particles have reactive groups and about 65% of the particles do not have reactive groups, or about 40% of the particles have reactive groups and about 60% of the particles do not have reactive groups, or about 45% of the particles have reactive groups and about 55% of the particles do not have reactive groups, or about 50% of the particles have reactive groups and about 50% of the particles do not have reactive groups. In some embodiments, some of the particles may be functionalized with both reactive and unreactive groups on the same particle.

The ensemble of particles may include a mixture of sizes, reactive and non-reactive particles and different types of particles, for example, organic particles including polymeric particles such as acrylics, polycarbonates, polystyrenes, silicones and the like; or inorganic particles such as glasses or ceramics including, for example, silica and zirconium oxide, and the like.

The binder can be or include any material that may be desirable in an application. For example, the binder can be a curable material that forms a polymer, such as a cross-linked polymer. In general, the binder can be any polymerizable material, such as a polymerizable material that is radiation-curable, such as a UV curable material.

The low refractive index layer can be produced using any method that may be desirable in an application. In some embodiments, the low refractive index layer can be produced by the processes described in co-pending application titled "PROCESS AND APPARATUS FOR A NANOVOIDED ARTICLE", U.S. Ser. No. 61/169,429, co-pending application titled "PROCESS AND APPARATUS FOR COATING WITH REDUCED DEFECTS", U.S. Ser. No. 61/169,427, and co-pending application titled "PROCESS FOR GRADIENT NANOVOIDED ARTICLE", U.S. Ser. No. 61/254,674, the disclosures of which are incorporated in their entirety herein by reference.

By controlling the polymerization, drying, and cure environment, the morphology can be controlled. The process may also utilize a controlled environment region between the coating station and polymerization apparatus, as described elsewhere. This region enables improved control of the coated film composition and environment. The polymerization apparatus can be located anywhere between the coating station and dryer. Controlling the environment during polymerization is also advantageous. The polymerized coating is subsequently dried and may be further post-processed with, for example, conventional UV radiation systems to further cure the material. Radiation sources that could be used in the polymerization apparatus include LEDs, UV lasers, UV lamps, and e-beam).

In some embodiments, after the polymerization step, the solvent may still include some of the polymerizable material, although at a lower concentration. Next, the solvent is removed by drying or evaporating the solution resulting in a low refractive index layer that includes a network, or a plurality, of voids dispersed in a polymer binder. The low refractive index layer further includes a plurality of particles dispersed in the polymer. The particles are bound to the binder, where the bonding can be physical or chemical, or be encapsulated by the binder.

The low refractive index layer can have other materials in addition to the binder and particles. For example, the low refractive index layer can include one or more additives, such as for example, coupling agents, to help wet the surface of a substrate, not expressly shown herein, on which the low refractive index layer is formed. As another example, the low refractive index layer can include one or more colorants, such a carbon black, for imparting a color, such as the black color, to the low refractive index layer. Other exemplary materials in low refractive index layer can include initiators, such as one or more photo-initiators; anti-stats; adhesion promoters; surfactants; UV absorbers; release agents; or others, as described elsewhere. In some embodiments, the low refractive index layer can include a down converting material that is capable of absorbing light and reemitting a longer wavelength light. Exemplary down converting materials include phosphors.

In general, the low refractive index layer can have a range of desirable porosities for any weight ratio of the binder to plurality of the particles. Accordingly, in general, the weight ratio can be any value that may be desirable in an application. In some embodiments, the weight ratio of binder to plurality of particles is not less than about 1:2.5, or not less than about 1:2.3, or not less than about 1:2, or not less than (or is greater than) about 1:1, or not less than about 1.5:1, or not less than about 2:1, or not less than about 2.5:1, or not less than about 3:1, or not less than about 3.5:1, or not less than about 4:1, or not less than about 5:1. In some embodiments, the weight ratio is in a range from about 1:2.3 to about 4:1.

In some embodiments, the top major surface of low refractive index layer can be treated to, for example, improve the adhesion of the low refractive index layer to another layer. For example, the top surface can be corona treated.

Surface modification of the particles can be accomplished in a variety of known ways, such as those described in U.S. patent application Ser. No. 11/027,426, filed Dec. 30, 2004, and U.S. Pat. No. 6,376,590, which is incorporated herein by reference.

Additional exemplary particles are described in U.S. Patent Application No. 61/169,466 entitled "OPTICAL FILM," filed on Apr. 15, 2009. In some embodiments, the particles in the low index refractive layer can be approximately spherical or elongate.

In some embodiments, the low refractive index layers or material has a BET porosity that is greater than about 40% (which corresponds to a surface area of about 50 $m^2/g$ as determined by the BET method), porosity greater than about 50% (which corresponds to a surface area of about 65-70 $m^2/g$ as determined by the BET method), greater than about 60% (which corresponds to a surface area of about 80-90 $m^2/g$ as determined by the BET method), and most preferably between about 65% and about 80% (which corresponds to a surface area of values greater than about 100 $m^2/g$ and about 220 $m^2/g$ as determined by the BET method). In some embodiments, the volume fraction of the plurality of interconnected voids in the low refractive index layer is not less than (or is greater than) about 20%, or greater than about 30%, or greater than about 40%, or greater than about 50%, or greater than about 60%, or greater than about 70%, or greater than about 90%. The BET surface area and percent porosity values will be dictated by the need to balance the low refractive index and other critical performance properties such as cohesive strength of the coating. As used herein, the term "BET method" refers to the Braunauer, Emmett, and Teller surface area analysis (See S. Brunauer, P. H. Emmett and E. Teller, *J. Am. Chem. Soc.*, 1938, 60, 309). The BET method is a well-known, scientifically validated method used to determine pore size, surface area, and percent porosity of a solid substance. BET theory relates to the physical adsorption of gas molecules on a solid surface and serves as the basis for obtaining physical information about the surface area and porosity of a solid surface.

The retroreflective articles of the present disclosure can have any desired optical haze. In some embodiments, low refractive index layer 960 has an optical haze that is not less than (or is greater than) about 20%, or greater than about 30%, or greater than about 40%, or greater than about 50%, or greater than about 60%, or greater than about 70%, or greater than about 80%, or greater than about 90%, or greater than about 95%. In some embodiments, the low index refractive layer has a low optical haze. For example, in some embodiments, the optical haze of the low index refractive layer is less than about 20%, less than about 7%, less than about 5%, less than about 3%, less than about 2%, less than about 1.5%, or less than about 1%.

The low index refractive layer can be formed by any suitable method, such as slot coating, direct and indirect gravure coating, knife coating, Mayer rod coating, and roll coating, also in for example, automated web-to-web coating processes. In some embodiments, low refractive index layer 960 is coated on surface 940 of retroreflective layer 930. As used herein, the term "coated" can mean planarized or conformal. Coated is meant to point to the method of application (e.g., knife coated, die coated, gravure coated, slide coated, ink jet printed, etc.).

In some embodiments, portions of neighboring major surfaces of each two neighboring layers in retroreflective article 900 are in physical contact with each other. For example, portions of neighboring structured major surfaces 951 and 940 of respective neighboring layers 960 and 930 in retroreflective article 900 are in physical contact with each other. For example, at least 30%, or at least 40%, or at least 50%, or at least 60%, or at least 70%, or at least 80%, or at least 90%, or at least 95% of the two neighboring major surfaces are in physical contact with each other.

In some embodiments, portions of neighboring major surfaces (major surfaces that face each other or are adjacent to each other) of each two neighboring layers in retroreflective article 900 are in physical contact with each other. For example, in some embodiments, there may be one or more additional layers, not expressly shown in FIG. 1A, disposed between low refractive index layer 960 and retroreflective layer 930. In such embodiments, substantial portions of neighboring major surfaces of each two neighboring layers in retroreflective article 900 are in physical contact with each other. In such embodiments, at least 30%, or at least 40%, or at least 50%, or at least 60%, or at least 70%, or at least 80%, or at least 90%, or at least 95% of the neighboring major surfaces of each two neighboring layers in the optical construction are in physical contact with each other.

Figure 2:
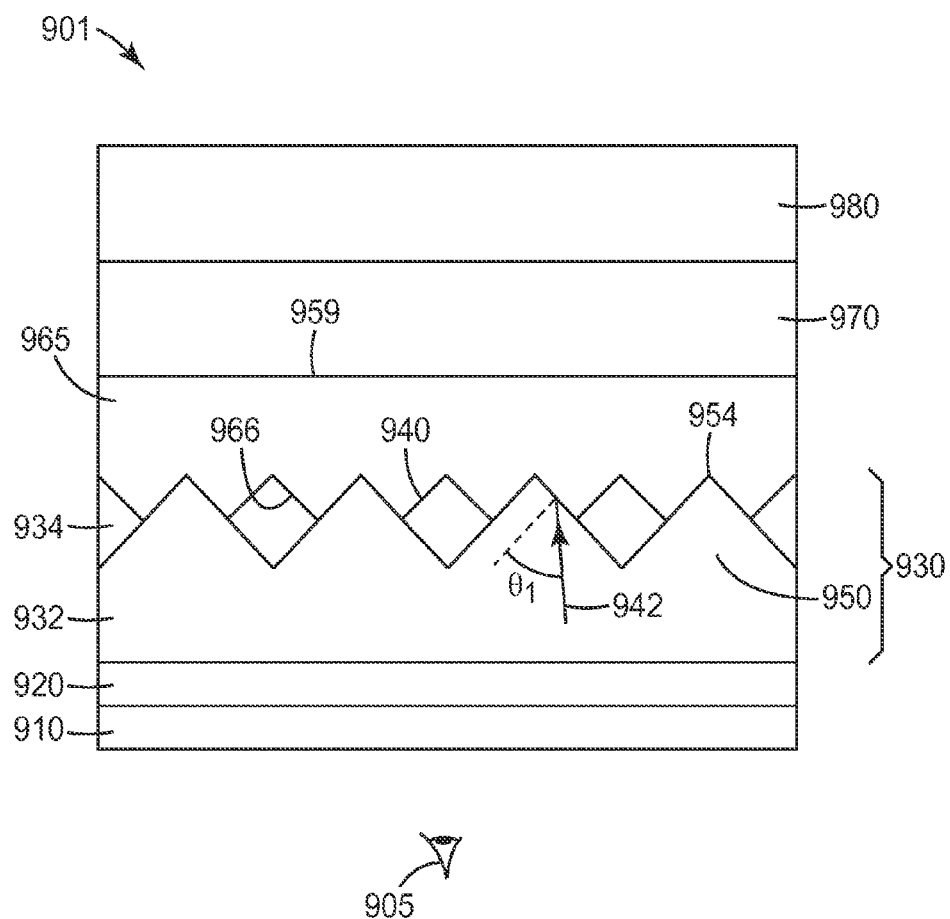
FIG. 2 is a schematic side view of another retroreflective optical construction.

FIG. 2 is a schematic side view of a retroreflective construction or article 901 that includes optional graphics layer 910, second substrate 920 disposed on or adjacent to graphics layer 910, a retroreflective layer 930 disposed on or adjacent to second substrate 920, an low refractive index layer 965 disposed on or adjacent to retroreflective layer 930, an optical adhesive layer 970 disposed on or adjacent to low refractive index layer 956, and first substrate 980 disposed on or adjacent to optical adhesive layer 970. In the retroreflective article or construction 901 of FIG. 2, low refractive index layer 965 includes a structured major surface 966 that faces a structured major surface 940 of retroreflective layer 930. There may be one or more additional layers, not expressly shown in FIG. 2, between retroreflective layer 930 and low refractive index layer 965.

In the exemplary optical constructions 900 and 901 of FIGS. 1A, 1B, and 2, low index layers 960 and 965 fill the grooves in between optical elements 950 and substantially planarize retroreflective structured surface 940, meaning that the top surfaces 923 and 959 of respective low refractive index layers 960 and 965 are substantially planar. For example, in some embodiments, the difference between the maximum and minimum heights of top surface 923 and 959 as measured from a common reference plane such as reference surface 936 (or the equivalent in FIG. 2), is not more than (or is less than) about 20%, or less than about 15%, or less than about 10%, or less than about 5% of height $h_1$ of optical elements 950, where $h_1$ is the distance 958 between apex 954 and base 956.

Figure 3:
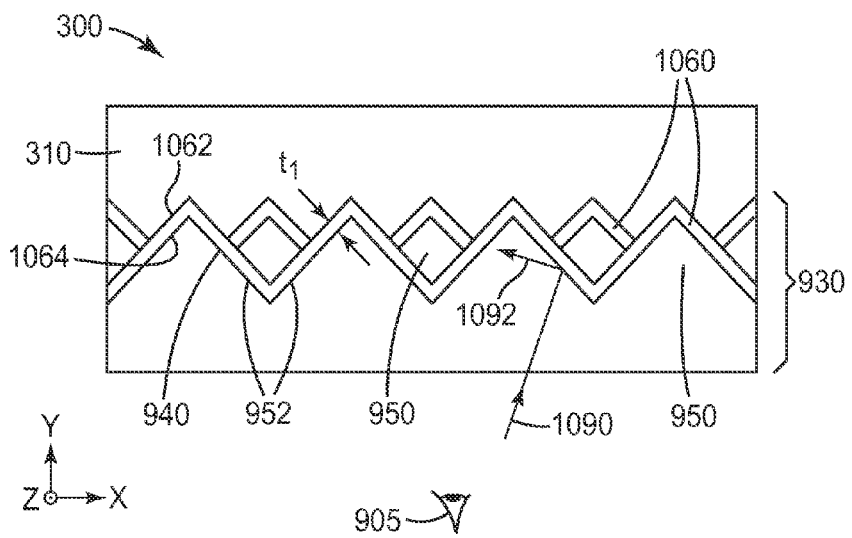
FIG. 3 is a schematic side view of another retroreflective optical construction.

In some embodiments, the low index refractive layer does not planarize the structured surface. For example, FIG. 3 is a schematic side view of an optical construction 300 that includes a low refractive index layer 1060 that is substantially conformally disposed on (or adjacent to) retroreflective structured surface 940 and an optical layer 310 that is disposed on (or adjacent to) and substantially planarizes low index refractive layer 1060. Optical layer 310 can, for example, be a substrate of the same or a similar type as substrate 980, an adhesive layer of the same or a similar type as adhesive layer 970, or an optically diffusive layer of the same or a similar type as optically diffusive layer 995. Low refractive index layer 1060 includes two structured major surfaces. More specifically, low refractive index layer 1060 comprises a first structured major bottom surface 1064 that faces retroreflective layer 930 and a second structured major top surface 1062 that is opposite first structured major surface 1064.

Low refractive index layer 1060 has a thickness $t_1$. In some embodiments, thickness $t_1$ is not less than the minimum thickness required to substantially support total internal reflection at the retroreflective surface. In such embodiments, $t_1$ is sufficiently large so that the evanescent tail of an incident optical ray 1090 at the interface between retroreflective layer 930 and low refractive index layers 1060 remains substantially within the low index refractive layer and does not extend, or extends very little, into the neighboring optical layer 310. In such embodiments, incident light ray 1090 is totally internally reflected as light ray 1092 and no fraction, or a very small fraction, of the incident light ray couples into optical layer 310. In such embodiments, thickness $t_1$ is not less than (or is greater than) about 0.5 microns, or greater than about 0.6 microns, or greater than about 0.7 microns, or greater than about 0.8 microns, or greater than about 0.9 microns, or greater than about 1 micron, or greater than about 1.1 microns, or greater than about 1.2 microns, or greater than about 1.3 microns, or greater than about 1.4 microns, or greater than about 1.5 microns, or greater than about 1.7 microns, or greater than about 2 microns.

Figure 4:
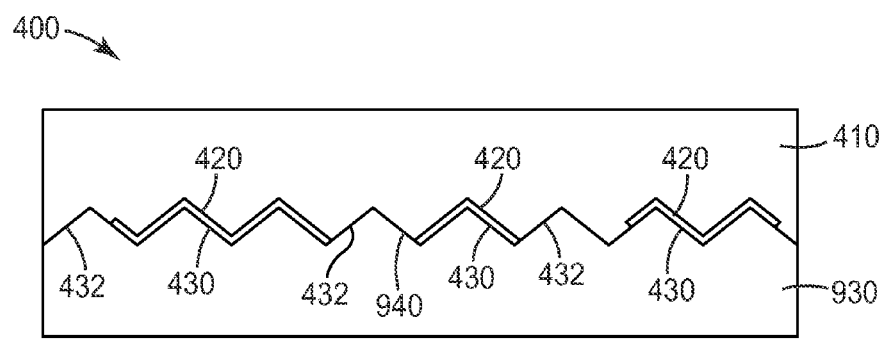
FIG. 4 is a schematic side view of another retroreflective optical construction.

In the exemplary optical constructions 900 and 901 of FIGS. 1A, 1B, and 2, low refractive index layers 960 and 965 cover substantially the entire structured retroreflective surface 940. In some alternative embodiments, the low index refractive layer can form a pattern. In some alternative embodiments, the low index refractive layer can cover only a portion or multiple portions of retroreflective surface 940. For example, FIG. 4 is a schematic side view of a construction 400 that includes a patterned low refractive index layer 420 that covers portions of surface 940. In particular, low refractive index layer 420 covers, substantially conformally, portions 430 of surface 940, but does not cover and leaves exposed other portions 432 of surface 940. Low refractive index layer 420 forms a pattern on surface 940. In some embodiments, the pattern can be a regular pattern. In some alternative embodiments, the coating is irregular and does not form a pattern. By pattern coating, the adhesive that is laminated to the retroreflective construction forms seal areas around the areas that include a low refractive index material.

Low refractive index layer 420 can be any layer that promotes TIR or enhances internal reflection and can be the same as or similar to low refractive index layer 960 or 965. Optical construction 400 also includes an optically diffusive layer 410 that is disposed on or adjacent to low refractive index layer 420 and uncovered portions 430. In some embodiments, optically diffusive layer 410 includes a plurality of particles, such as a plurality of $TiO_2$ particles, dispersed in a binder, where the index of the binder is close to the index of refraction of retroreflective layer 930. In such embodiments, the optical construction will effectively retroreflect light incident on the covered portions 430, but will not retroreflect light incident on the uncovered portions 432. Optically diffusive layer 410 can give the optical construction a white appearance in certain lighting, such as day light, conditions. As described above, optically diffusive layer 410 is optional and optical construction 400 need not include optically diffusive layer 410.

Figure 5:
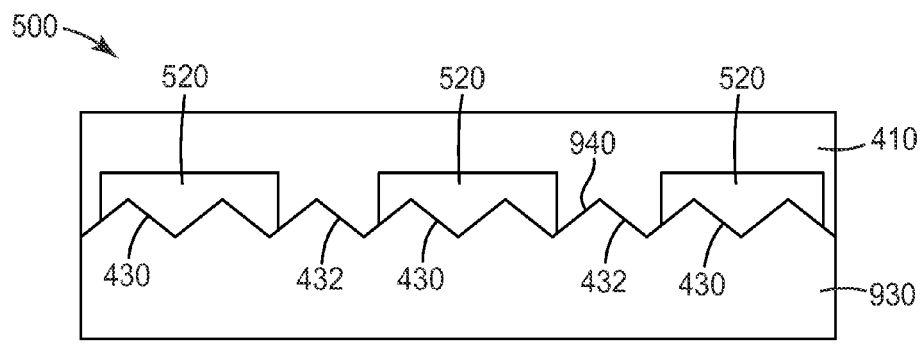
FIG. 5 is a schematic side view of another retroreflective optical construction.

FIG. 5 is a schematic side view of an optical construction 500 that includes a patterned low index refractive layer 520 that covers portions of surface 940. In particular, low refractive index layer 520 covers and substantially planarizes portions 430 of surface 940, but does not cover and leaves exposed other portions 432 of surface 940. Optical construction 500 is similar to optical construction 400 except that low refractive index layer 420 conformally covers portions 430 of surface 940, whereas low refractive index layer 520 planarizes portions 430 of surface 940. Low index refractive layers 420 and 520 can be the same as or similar to any low index refractive layers disclosed herein. In some embodiments, the percent area of portions 430 of retroreflective surface 940 that are covered by low refractive index layer 420 or 520, is less than about 60%, or less than about 50%, or less than about 40% of the total structured area.

Figure 6:
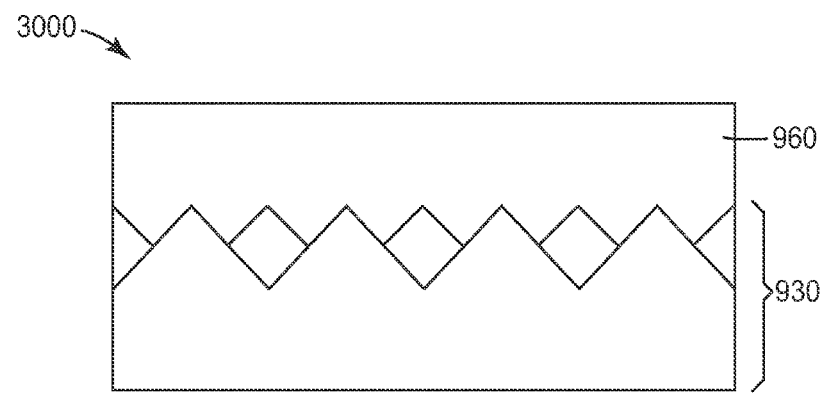
FIG. 6 is a schematic side view of another retroreflective optical construction.

FIG. 6 is a schematic side view of an optical construction 3000 that includes a low index refractive layer 960 that covers the surface of flexible prismatic retroreflective layer 930.

Figure 8A:
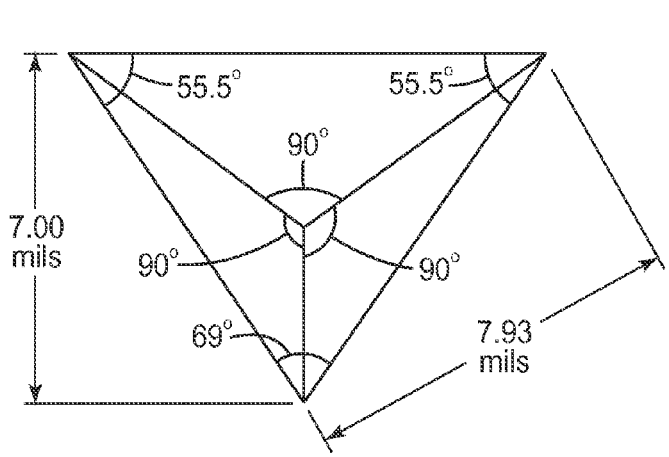
FIGS. 8A and 8B are respective schematic top view and side view of an individual prism in another prismatic retroreflective layer.
Figure 8B:
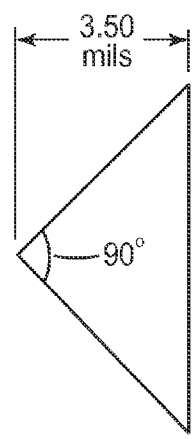
Figure 9:
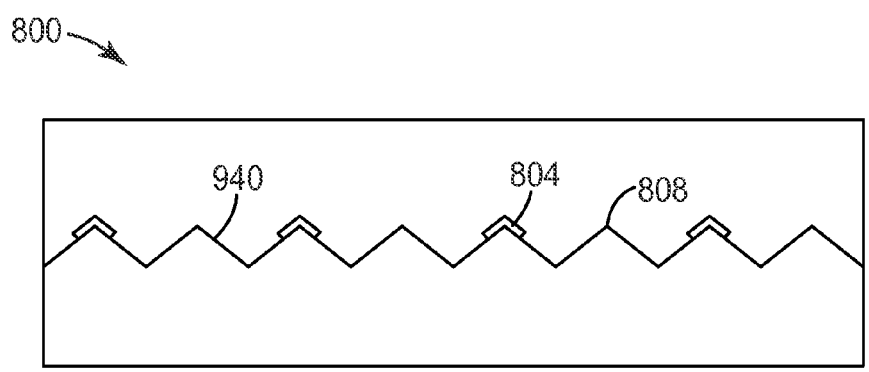
FIG. 9 is a schematic side view of another retroreflective optical construction.

FIG. 9 is a schematic side view of an optical construction 800 that includes a low index refractive layer, material, or coating 804 that conformally covers optical element tips 808. In particular, low refractive index layer, material, or coating 804 covers portions (including optical element tips 808) of surface 940, but does not cover and leaves exposed other portions of surface 940. While not shown in FIG. 8, an optical film of the same or a similar type as optical film 310 can be used to planarize low index refractive layer, material, or coating 804. In the specific embodiment shown in FIG. 8, low index refractive layer, material, or coating 804 is adjacent to only some of optical element tips 808. In alternative embodiments, the low refractive index coating can be applied to all, more, or fewer optical element tips than that shown in FIG. 8. Also, application of the low refractive index layer, material, or coating to the optical element tips can form a pattern or can be irregular or can be regular but not form a pattern.

The low refractive index layers, coatings, and materials and the retroreflective articles and constructions described herein can be incorporated into retroreflective devices such as those used in reflective signs, license plates, and advertising displays. The articles and constructions described herein produce highly reflective devices that have a coefficient of retroreflection (Ra) from 40 to greater than 200 candle power when measured according to the methods described herein. In addition, the optically diffuse low index constructions are also useful in semi-specular devices which require both high reflection and diffuse specular characteristics.

Formation of a retroreflective article can include patterns that, for example, create closed cells, to create images that only appear in retro, increase whiteness, act as a security feature, and/or enhance adhesion.

Some of the advantages of the disclosed articles, films, layers, constructions, and systems are further illustrated by the following examples. The particular materials, amounts and dimensions recited in this example, as well as other conditions and details, should not be construed to unduly limit the present disclosure.

Example 1

Coating solutions 1-9 were made using hydrophobic resins listed in Table I. For each coating solution, the resin and the fumed silica (available as TS-530 from Cabot Corporation, Billerica Mass.) at the weight ratio specified in Table I were mixed with the corresponding solvent also specified in Table I. The resin had a wt-part of 1. For example, for coating solution 1, the weight ratio of resin FC2145 to fumed silica was 1:5.

The resin used in coating solutions 1, 2, and 9 was Dyneon Fluoroelastomer Copolymer FC2145 (available from Dyneon LLC, Oakdale Minn.). The resin used in coating solutions 3 and 4 was SPU-5k which was a silicone polyurea formed from the reaction between an α,ω aminopropyl polydiemthyl siloxane and m-tetramethyl xylene diisocyante as generally described in U.S. Pat. No. 6,355,759, Example #23. The resin used in coating solutions 5 and 6 was SR-351, a UV-polymerizable monomer (available from Sartomer Company, Exton Pa.). The resin used in coating solutions 7 and 8 was Ebecryl 8807 (EB-8807), a UV-polymerizable monomer (available from Cytec Corporation, West Paterson N.J.). Samples 5-8 were UV curable and included 1% by weight of Esacure KB-1 photoinitiator in methylethyl ketone (available from Lamberti USA, Conshohocken Pa.).

For each coating solution, the solvent was either isopropyl alcohol (IPA) or methanol (MeOH). The mixing of the resin, the fumed silica, and the solvent was done in a 300 mL stainless steel beaker. The fumed silica was dispersed in the resin using a Ross 100-LC single stage high shear mixer with a single stage slotted head rotor (available from Charles Ross and Sons, Hauppauge N.Y.) for about 3 minutes at 1200 rpm. Next, the resulting foam was allowed to settle. Next, the solid weight percentage was adjusted to 12% by adding more of the same solvent resulting in coating solutions 1-9.

Next, a coating method was developed for each coating solution. First, the coating solution was coated on a PVC Vinyl organosol substrate (available as Geon 178 from PolyOne, Avon Lake Ohio) using a round wire-rod (available as a Meyer rod from RD Specialties, Webster N.Y.), where the size of the rod is specified in Table I. The wet coating thickness was dictated by the wire-rod number. A number 30 wire-rod resulted in a wet coating thickness of approximately 75.2 microns, and a number 15 wire-rod resulted in a wet coating thickness of approximately 38.1 microns.

Coated samples 1-4 and 9 were dried at room temperature for 25 minutes. Coated samples 5-8 were cured with UV radiation using a Fusion Systems Light Hammer UV system (available from Fusion Systems Inc, Gaithersburg, Md.) that was equipped with a 500 Watt H-bulb. The coatings were cured with a single exposure at 40 feet per minute (12.3 meters per minute) which corresponded to a UV-B dose of about 49 mille-joules per square cm.

TABLE I

Formulation and Coating Parameters for Example 1

| Coating Solution # | Resin (wt-part = 1) | f-SiO$_2$ (wt-part) | Solvent | Coating Rod | Photo Initiator |
|---|---|---|---|---|---|
| 1 | FC2145 | 5 | MeOH | 30 | — |
| 2 | FC2145 | 5 | MeOH | 15 | — |
| 3 | SPU-5k | 5 | IPA | 30 | — |
| 4 | SPU-5k | 5 | IPA | 15 | — |
| 5 | SR-351 | 5 | IPA | 30 | 1% KB-1 |
| 6 | SR-351 | 5 | IPA | 15 | 1% KB-1 |
| 7 | EB-8807 | 5 | IPA | 30 | 1% KB-1 |
| 8 | EB-8807 | 5 | IPA | 15 | 1% KB-1 |
| 9 | FC2145 | 0 | MeOH | 30 | — |

Example 2

Coating solutions 10-15 were made using hydrophilic polyvinylalcohol (available as Poval PVA-235 from Kuraray America, Houston Tex.) as specified in Table II. For each coating solution, the resin and the fumed silica (available as Cabo-O-Sperse PG002 from Cabot Corporation, Billerica Mass.) were mixed at the weight ratio specified in Table II. The resin had a wt-part of 1. For example, for coating solution 10, the weight ratio of the resin, PVA-235, to the fumed silica was 1:4. First, the PVA-235 resin was added as a 7% by weight solution in water to a stainless steel beaker equipped with an air drive mixer that was operated at a low speed to minimize foaming. Tergitol Min-Foam XL (available from Dow Chemical Company, Midland Mich.) at 1% of the weight of PVA-235, and NH$_4$OH at 2-3% of the weight of PVA-235, were added to the mixer to adjust the pH to approximately 9.5-10. Next, fumed silica was added as a 20% by weight solution in water. If needed, a sufficient quantity of CX-100, specified in Table II as a percent of the weight of the resin, was added to the mixer and the mixture was stirred until a homogenized solution was obtained. Next, deionized water was added to adjust the percentage of solids to the value specified in Table II.

Next, a coating method was developed for each coating solution. An automated notch bar coating process was used to coat each coating solution on a PVC Vinyl organosol substrate at a coating speed of 7.62 meters per second. The resulting coated sample was then dried at 65° C. for 5 minutes.

TABLE II

Formulation and Coating Parameters for Example 2

| Coating Solution # | Resin | PG-002 wt-part | Wt % CX100 | Final wt % Solids |
|---|---|---|---|---|
| 10 | PVA-235 | 4 | 0 | 13.5 |
| 11 | PVA-235 | 4 | 10 | 13.5 |
| 12 | PVA-235 | 6 | 0 | 15 |
| 13 | PVA-235 | 6 | 10 | 15 |
| 14 | PVA-235 | 6 | 15 | 15 |
| 15 | PVA-235 | 0 | 0 | 15 |

Example 3

Figure 7A:
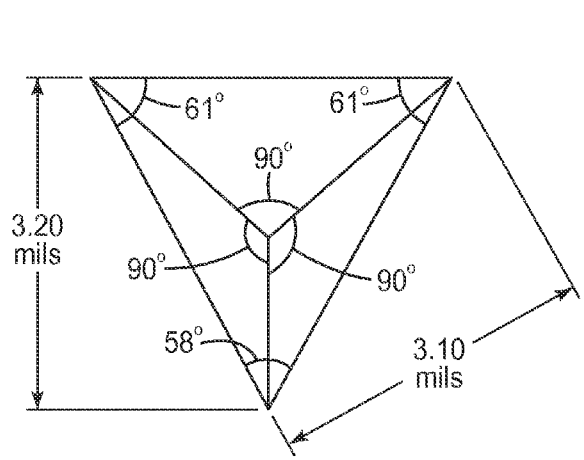
FIGS. 7A and 7B are respective schematic top view and side view of an individual prism in a prismatic retroreflective layer.
Figure 7B:
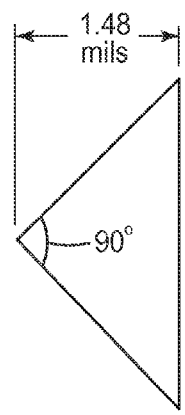

Retroreflective optical construction 3000, a schematic side view of which is shown in FIG. 6, was made. Optical construction 3000 was similar to a corresponding construction in FIG. 1A and included flexible prismatic retroreflective layer 930 and low refractive index layer 960 coated on the retroreflective layer. The low index refractive layer substantially planarized the structured side of the retroreflective layer. FIGS. 7A and 7B are respective schematic top-view and side view of an individual prism in the prismatic retroreflective layer. The angles in FIGS. 7A and 7B are in degrees, and the dimensions are in mils. Each facet of a prism in the retroreflective layer was a right angled triangle and the base was an isosceles triangle. The prisms were made using the methods generally described in, for example, U.S. Pat. Nos. 6,843,571 and 5,691,846, the disclosures of which are incorporated in their entireties herein by reference.

Retroreflective optical constructions 1-9, similar to construction 3000, were made following the procedure described in Example 2. Constructions 1-9 corresponded to respective samples 1-9 made in Example 2. Construction "A" was the prismatic retroreflective layer with no coating (that is, layer 960 was air).

Coefficient of retroreflection R$_A$ in units of cd/(lux·m$^2$) were measured for the constructions according to ASTM E-810 test method at 0.2 degree observation angle and −4 degrees entrance angle, and at 0.2 degree observation angle and 30 degrees entrance angle. The measurements were taken for two orthogonal prism orientations. The measured results for R$_A$ are summarized in Table III.

TABLE III

Retroreflective Properties of Samples in Example 3

| Construction No. | Observation Angle: 0.2° Entrance Angle: −4° Film Orientation (Degrees) | | Observation Angle: 0.2° Entrance Angle: 30° | |
|---|---|---|---|---|
| | 0 | 90 | 0 | 90 |
| 1 | 363 | 355 | 54 | 57 |
| 2 | 304 | 287 | 53 | 33 |
| 3 | 199 | 200 | 20 | 27 |
| 4 | 294 | 273 | 32 | 23 |
| 5 | 234 | 214 | 30 | 25 |

TABLE III-continued

Retroreflective Properties of Samples in Example 3

| Construction | Observation Angle: 0.2° Entrance Angle: −4° Film Orientation (Degrees) | | Observation Angle: 0.2° Entrance Angle: 30° Film Orientation (Degrees) | |
|---|---|---|---|---|
| No. | 0 | 90 | 0 | 90 |
| 6 | 174 | 160 | 20 | 18 |
| 7 | 272 | 256 | 37 | 30 |
| 8 | 273 | 254 | 41 | 28 |
| 9 | 0.1 | 0.1 | 0.3 | 0.4 |
| A | 571 | 574 | 69 | 52 |

Example 4

Retroreflective optical constructions 10-15, similar to construction 3000, were made following the procedure described in Example 2. Constructions 10-15 corresponded to respective samples 10-15 made in Example 2. Construction "B" was the prismatic retroreflective layer with no coating (that is, layer 960 was air).

Coefficient of retroreflection $R_A$ in units of cd/(lux·m$^2$) were measured for the optical constructions at 0.2 degree observation angle and −4 degrees entrance angle, and at 0.2 degree observation angle and 40 degrees entrance angle. The measurements were taken for two orthogonal prism orientations. The measured results for $R_A$ are summarized in Table IV.

TABLE IV

Retroreflective Properties of Samples in Example 4.

| Construction | Observation Angle: 0.2° Entrance Angle: −4° Film Orientation (degrees) | | Observation Angle: 0.2° Entrance Angle: 40° Film Orientation (degrees) | |
|---|---|---|---|---|
| No. | 0 | 90 | 0 | 90 |
| 10 | 324 | 320 | 28.1 | 14.2 |
| 11 | 322 | 318 | 22.8 | 15 |
| 12 | 363 | 356 | 30 | 16.8 |
| 13 | 336 | 335 | 21.5 | 18.9 |
| 14 | 297 | 283 | 11.6 | 11.5 |
| 15 | 0.1 | 0.1 | 0.1 | 0.1 |
| B | 571 | 574 | 29 | 17 |

Example 5

Retroreflective optical constructions 3000 were made. Prismatic retroreflective layer 930 was rigid and made using the methods generally described in, for example, U.S. Pat. No. 6,884,371, the disclosure of which is incorporated in its entirety herein by reference. The low index refractive layer substantially planarized the structured side of the retroreflective layer. FIGS. 8A and 8B are respective schematic top-view and side view of an individual prism in the prismatic retroreflective layer. The angles in FIGS. 8A and 8B are in degrees, and the dimensions are in mils. The facets of the prisms were right angled triangles and the bases were isosceles triangles.

Retroreflective optical constructions 1-7, similar to construction 3000, were made following the procedure described in Example 1. Constructions 1-6 corresponded to respective samples 1-6 made in Example 1. Optical construction 7 corresponded to sample 9 in Example 1. Construction "C" was the prismatic retroreflective layer with no coating (that is, layer 960 was air).

Coefficient of retroreflection $R_A$ in units of cd/(lux·m$^2$) were measured at 0.2 degree observation angle and −4 degrees entrance angle, and at 0.2 degree observation angle and 30 degrees entrance angle. The measurements were taken for two orthogonal prism orientations. The measured results for $R_A$ are summarized in Table V.

TABLE V

Retroreflective Properties of Samples in Example 5

| Construction | Observation Angle: 0.2° Entrance Angle: −4° Film Orientation (Degrees) | | Observation Angle: 0.2° Entrance Angle: 30° Film Orientation (Degrees) | |
|---|---|---|---|---|
| No. | 0 | 90 | 0 | 90 |
| 1 | 520 | 587 | 136 | 208 |
| 2 | 1092 | 1180 | 380 | 426 |
| 3 | 1220 | 1260 | 399 | 467 |
| 4 | 1228 | 1244 | 399 | 424 |
| 5 | 448 | 610 | 102 | 204 |
| 6 | 315 | 338 | 62 | 129 |
| 7 | 15 | 19 | 30 | 30 |
| C | 1260 | 903 | 644 | 605 |

Example 6

Retroreflective optical construction 3000, a schematic side view of which is shown in FIG. 6, was made. Optical construction 3000 was similar to a corresponding construction in FIG. 1A and included flexible prismatic retroreflective layer 930 and low refractive index layer 960 coated on the retroreflective layer. The low index refractive layer substantially planarized the structured side of the retroreflective layer. FIGS. 7A and 7B are respective schematic top-view and side view of an individual prism in the prismatic retroreflective layer. The angles in FIGS. 7A and 7B are in degrees, and the dimensions are in mils. Each facet of a prism in the retroreflective layer was a right angled triangle and the base was an isosceles triangle. The prisms were made using the methods generally described in, for example, U.S. Pat. Nos. 6,843,571 and 5,691,846.

First, a coating solution was made. In a 2 liter three-neck flask, equipped with a condenser and a thermometer, 960 grams of IPA-ST-UP organosilica elongated particles (available from Nissan Chemical Inc., Houston, Tex.), 19.2 grams of deionized water, and 350 grams of 1-methoxy-2-propanol were mixed under rapid stirring. The elongated particles had a diameter in a range from about 9 nm to about 15 nm and a length in a range from about 40 nm to about 100 nm. The particles were dispersed in a 15.2% wt IPA. Next, 22.8 grams of Silquest A-174 silane (available from GE Advanced Materials, Wilton, Conn.) was added to the flask. The resulting mixture was stirred for 30 minutes.

The mixture was then kept at 81° C. for 16 hours. Next, the solution was allowed to cool down to room temperature. Next, about 950 grams of the solvent in the solution were removed using a rotary evaporator under a 40° C. water-bath, resulting in a 41.7% wt A-174-modified elongated silica clear dispersion in 1-methoxy-2-propanol.

Next, 407 grams of this clear dispersion, 165.7 grams of SR 444 (available from Sartomer Company, Exton, Pa.), 8.28 grams of photoinitiator Irgacure 184 and 0.828 grams of photoinitiator Irgacure 819 (both available from Ciba Specialty Chemicals Company, High Point N.C.), and 258.6 grams of isopropyl alcohol were mixed together and stirred resulting in a homogenous coating solution of 40% solids.

Next, a coating method was developed for the coating solution. Approximately 1 ml of the 40% solids coating solution was applied to the flexible prismatic retroreflective layer. A 1.0 mil thick SBOPP (simultaneously biaxially oriented polypropylene) liner was hand laminated onto the solution to create a uniform layer of coating solution. The liner was slightly above the peaks of the corner cubes. Next, the sample was cured in a single exposure by passing the sample through a belt-fed ultra-violet lamp system (available from RPC industries, Plainfield, Ill.) fitted with two 200 Watt medium pressure Hg bulbs, at 50 fpm, yielding a UVA dose of 300 mJ/cm² in air. The samples were then removed from the chamber, the SBOPP liner was removed, and the sample was placed in a 120° F. oven for about 10 minutes to dry.

Coefficient of retroreflection $R_A$ in units of cd/(lux·m²) were measured for the constructions according to ASTM E-810 test method at 0.2 degree observation angle and −4 degrees entrance angle, and at 0.2 degree observation angle and 30 degrees entrance angle. The measurements were taken for two orthogonal prism orientations. The measured results for $R_A$ are summarized in Table VI.

TABLE VI

Retroreflective Properties of Samples in Example 6

| Construction No. | Observation Angle: 0.2° Entrance Angle: −4° Film Orientation (Degrees) | | Observation Angle: 0.2° Entrance Angle: 30° Film Orientation (Degrees) | |
|---|---|---|---|---|
| | 0 | 90 | 0 | 90 |
| Example 6 | 99.6 | 101 | 6 | 4 |

Example 7

A 25 g solution of the coating formulation 12 described in Example 2 was dried at 50° C. in a 200 ml beaker. The dried formulation was collected and ground into a fine powder with a ceramic motor and pestle and was dried further at 80° C. for 16 hrs. The solid powder was then submitted for BET analysis along with control samples CE-A, CE-B and CE-C prepared in a similar manner. Control sample CE-A was made using Poly(methylmethacrylate)-Cabot TS 530 f-SiO₂ mixture (PMMA-Si 1:5, where the PMMA was obtained from Aldrich Chemicals and the mixture was dried from 15% solids in MEK instead of water). Control sample CE-B was made from a PMMA-NALCO 2327 1:5 by weight mixture (Nalco 2327 was a non-porous 20 nm colloidal silica dispersion available from Rohm and Haas of Philadelphia, Pa.). Control sample CE-C was made from Cabot TS 530 f-SiO₂ with no resin. The BET data are shown in Table VII.

The surface area, porosity and skeletal density of the dried coating formulations were measured by means of a Quantachrome Autosorb 1 BET analyzer (available from Quantachrome Instruments of Boynton Beach. Fla.). The samples were subjected to a 40 point analysis to determine their surface area and pore size distribution. The BET method of surface area analysis (due to Braunauer, Emmett and Teller) was used to determine pore size, surface area and per cent for each of the samples.

TABLE VII

Pore Volume, Pore Fraction and Surface Area for Samples of Example 7

| Sample | Mixture | Pore Volume (cc/g) | Pore Fraction (NLDF) | Surface Area m²/g |
|---|---|---|---|---|
| 12 | 1:6 PVA-Si | 0.86 | 63% | 107 |
| CE-A | 1:5 PMMA-Si | 0.953 | 65% | 118 |
| CE-B | 1:5 PMMA-collodial silica (non-porous silica) | 0.098 | 16% | 11 |
| CE-C | TS 530 fumed Si No Resin | 2.425 | 84% | 312 |

The BET data in Table VII indicate that the resin samples made with the porous f-SiO₂ maintain the high level of porosity and high surface area relative to a silica mixture that does not contain any porous particle system (CE-B).

Examples 8-14

The following description was used in preparing Examples 8 through 14: A retroreflective layer was prepared by casting cube corner microstructures onto an overlay film, as described in U.S. Pat. No. 5,691,846 (Benson), incorporated herein by reference. A retroreflective optical construction was prepared by coating at least some of the cube corner microstructures with a low refractive index composition or material. Alternatively, a low index material could be laminated to the cube corner microstructures. In some examples, the low refractive index material was selectively coated (e.g., pattern coated) on the cube corner microstructures. In some examples, a second composition was coated onto or laminated to at least a portion of the structured surface of the retroreflective optical construction, providing a seal. Low index coating compositions are described in Coating Solution 16. Exemplary retroreflective optical constructions prepared according to the present disclosure are described in Examples 8-14.

Preparation of retroreflective layer: An overlay film was made by casting ethylene acid acrylate (EAA) (commercially available under the trade designation "Primacor 3440" from Dow Company of Midland, Mich.) at a film at a thickness of 0.01 cm (4 mil) onto a corona treated polyethylene terephthalate (PET) carrier approximately 53 in (134.6 cm) wide and 0.05 mm (0.002 in) thick. Pellets of EAA were fed into a 1.9 cm (¾ in) single screw extruder available from C.W. Brabender Instruments Inc., South Hackensack, N.J. The extruder temperature profile was from 140° C. (284° F.) to 175° C. (347° F.), resulting in a melt temperature of about 175° C. (347° F.). As the molten resin exited the extruder, it passed through a horizontal die (commercially available under the trade designation "Ultraflex-40" from Extrusion Dies Industries LLC, Chippewa Falls, Wis.) and was cast onto the PET carrier described above. The PET carrier was traveling at approximately 36 meters/min (120 ft/min). The resulting molten overlay film on the PET carrier was run between a rubber roll and a chilled steel backup roll to solidify the molten resin into a layer. The EAA surface was corona treated at 1.5 J/cm².

The resulting cube corner structure had three sets of intersecting grooves with a pitch or primary groove spacing of 81.3 microns (0.0032 inch). The intersecting grooves formed a cube corner base triangle with included angles of 61, 61, and 58 degrees and a cube corner element height of 37.6 microns (0.00148 inch). The primary groove spacing is defined as the groove spacing between the grooves which form the two 61 degree base angles of the base triangle.

The cube corner microstructures were prepared using a resin composition formed by combining 25 wt-% bisphenol A epoxy diacrylate (commercially available under the trade designation "Ebecryl 3720" from Cytek, Woodland Park, N.J.), 12 wt-% dimethylaminoethyl acrylate ("DMAEA"), 38 wt-% TMPTA (trimethylol propane triacrylate) and 25 wt-% 1,6 HDDA (hexanediol diacrylate). The formulation had 0.5 pph of TPO (2,4,6-trimethylbenzoyl diphenylphosphine oxide) photoinitiator.

The resin composition was cast at room temperature at 25 fpm onto a metal tool heated to 77° C. (170° F.). The resin composition filled the cavities of the cube corner microstructures in the tool via a rubber nip roller having a gap set to fill the cavities of the embossed pattern on the tool and minimize the amount of resin on the land area of the tool. A retroreflective layer was made by contacting the corona treated EAA film/PET carrier with the cube corner microstructures of the resin. The cube corner microstructure resin was cured through the PET carrier/EAA film on the tool with twelve Fusion D UV lamp (available from Fusion Systems, Rockville, Md.) set at 600 W/in. Dichroic filters were used in front of the UV lamps to minimize IR heating of the construction. Upon completion of the curing process and removal of the retroreflective layer from the tool, the cube corner microstructures were irradiated by a Fusion D UV lamp operating at 50% to provide a post-UV irradiation cure. The retroreflective layer was passed through an oven set at 127° C. (260° F.) to relax the stresses in the film.

Coating Solution 16

A low refractive index composition was prepared using a non-surface modified, alkaline stabilized dispersion of silica with a solids content of 30% was used (commercially available under the trade designation "Cabo-Sperse PG001" from Cabot. Bellerica, Mass.) and a polyvinyl alcohol (PVA) (commercially available under the trade designation "Poval 235" from Kuraray USA). To a 400 ml plastic beaker were added 100 g of a 7% solids PVA solution, 1.0 g of a nonionic surfactant (commercially available under the trade designation "Tergitol Min-Foam 1X" from Dow Chemical Company, Midland, Mich.), and 1 ml of a concentrated $NH_4OH$ solution. The solution was mixed at low shear using an air powered overhead laboratory mixer operating at low speed. Silica dispersion PG 001 (93 g) was then added to the solution. The blend was allowed to mix for approximately 15 minutes. The blend, comprising 1 part of PVA to 4 parts silica on a dry weight basis, was then transferred to a 1 L round bottom flask and placed on a rotary evaporator at a temperature of about 40° C. and 600 mmHg vacuum. The final solids content of the low index coating composition was adjusted to 18%. The pH was adjusted by the slow addition of 3 g of 0.25 M citric acid per 70 g of solution. In this pH range, the low refractive index composition was viscous, with a consistency similar to a paste.

Comparative Example D

A retroreflective layer prepared as described in "Preparation of Retroreflective Layer" was obtained.

Example 8

A 4 in. by 5 in. (10.16 cm by 12.7 cm) retroreflective layer was obtained and secured to an impression roll of a flexographic printer (commercially available under the trade designation "Flexiproof 100" from Testing Machines Inc., Ronkonkoma, N.Y.), with the cube corner microstructures facing outward. The printer was equipped with a 250 cells per linear inch (5.2 $Cbm/in^2$, wherein Cbm is cubic billion microns) (0.8 $Cbm/cm^2$) solid ceramic anilox roll and a solid flexographic stamp (no pattern).

A patterned retroreflective optical construction was prepared by selectively applying Coating Solution 16 on the tips of the cube corner microstructures using a printing speed of 25 m/min. The pressure on the impression roll was set at −4 units. The pressure on the anilox roll was set at −36 units. The samples were allowed to air dry for one to two minutes and were then placed in an oven and dried for about 5 minutes at 70° C.

Example 9

A patterned retroreflective optical construction was prepared as described in Example 8, except that the pressure on the impression roll was set at −24 units.

Example 10

A patterned retroreflective optical construction was prepared as described in Example 8, except that a second layer was laminated to the patterned cube corner microstructures, to provide a seal. A radiation-polymerizable pressure sensitive adhesive (PSA) was prepared as described in U.S. Pat. No. 5,804,610 (Hamer), incorporated herein by reference. The PSA composition was made by mixing 95 parts by weight isooctyl acrylate (IOA), 5 parts by weight acrylic acid (AA), 0.15 parts by weight Irgacure 651 (commercially available from Ciba Corporation, now a BASF Company, N.J.), 0.05 parts by weight isooctylthioglycolate (IOTG), and 0.4 parts by weight Irganox 1076 (commercially available from Ciba Corporation). The PSA composition was placed into packages made of a ethylene vinyl acetate copolymer film of 0.0635 mm thickness (commercially available under the trade designation "VA-24" from Pliant Corporation, Dallas, Tex.) measuring approximately 10 cm by 5 cm and heat sealed. The PSA composition was polymerized. About 25 parts of a tackifying resin (commercially available under the trade designation "Foral 3085" from Hercules Inc., Wilmington Del.) were added to an extruder along with 75 parts of the PSA composition and cast as a film onto a silicone release liner at a thickness of 2 mil (0.005 cm), as is generally described in Example 46 of U.S. Pat. No. 5,804,610, which is herein incorporated by reference. The PSA film was subjected to a second polymerization process. The PSA film was then laminated to the retroreflective optical construction using a hand squeeze roll laminator, wherein the adhesive contacted the patterned cube corner microstructures to provide a seal.

Example 11

A retroreflective optical construction was prepared as described in Example 10, except that an additional printing pass was used on the cube corner microstructures, for a total of two printing passes. The retroreflective optical construction was sealed with the PSA film, as described in Example 10.

Example 12

A retroreflective optical construction was prepared as described in Example 11, except that there were two additional printing passes, for a total of four printing passes. The retroreflective optical construction was sealed with the PSA film, as described in Example 10.

Example 13

A retroreflective optical construction was prepared as described in Example 12, except that there were four additional printing passes, for a total of eight printing passes. The retroreflective optical construction was sealed with the PSA film, as described in Example 10.

The low refractive index composition was mainly located on the tips of the cube corner microstructures when using one, two, or four printing passes, as described in Examples 10-12. The low refractive index composition was deposited on the tips, as well as in the area near the base of the cubes (valleys) when a total of eight printing passes (Example 13) were used.

The coefficient of retroreflection ($R_A$) of the retroreflective optical constructions prepared as described in Examples 10 through 13 was measured according to ASTM E810-03, at observation angles ("obs. angle") of 0.2, 1.0 and 4.0 degrees and at an entrance angle ("ent. angle") of −4 degrees. The coefficient of retroreflection ($R_A$) of retroreflective layers (i.e., prior to selectively coating the cube corner microstructures) ("Initial"), of coated retroreflective layers (i.e., after selectively coating the cube corner microstructures) ("Coated"), and of retroreflective optical constructions (i.e., after lamination of the coated retroreflective layer to the adhesive film) ("Laminated"), were measured. Retroreflectivity retention (%) was calculated by the ratio of the "laminated $R_A$" to the "initial $R_A$" was calculated. Coefficient of retroreflection $R_A$ and Retroreflectivity retention for Comparative example D, and Examples 10-13 are shown in Table VIII, below.

America, Houston, Tex.), 19.2 grams of deionized water, 350 grams of 1-methoxy-2-propanol, 22.8 grams of Silquest A-174 silane (available from GE Advanced Materials, Wilton, Conn.), 7.5 g of Irgacure 184 and 0.375 g of Irgacure 819 (both available from Ciba Company, now a Basf Company, NJ) were mixed under rapid stirring. The elongated particles had a diameter in a range from about 9 nm to about 15 nm and a length in a range of about 40 nm to about 100 nm. The resulting mixture was stirred for 30 minutes. The mixture was kept at 81° C. for 16 hours. Next, the solution was allowed to cool down to room temperature, and about 950 grams of the solvent in the solution was removed using a rotary evaporator under a 40° C. water-bath, resulting in a clear A-174-modified elongated silica solution having 44.56% wt A-174-modified elongated silica dispersed in 1-methoxy-2-propanol.

Example 14

Coating solution 18 was pattern coated onto the retroreflective layer. In pattern coating, a coating solution is selectively applied to the substrate (e.g., structured surface of the retroreflective layer). In pattern curing, the coating solution can be applied to the entire substrate and selectively cured to create areas that contain voids, and areas with no voids.

The solution was syringe-pumped at a rate of 4.0 cc/min into a 10.15 cm (4-inch) wide slot-type coating die. The slot coating die distributed a 10.15 cm wide coating onto a substrate moving at 5 ft/min (152 cm/min). The die lip was pulled away from the substrate until the coating bead broke into stripes. The resulting stripes were approximately ⅜ inches wide. Next, the coating was polymerized by passing the coated substrate through a UV-LED cure chamber that included a quartz window to allow passage of UV radiation.

TABLE VIII

Coefficient of Retroreflection $R_A$ and Retroreflectivity Retention for Comparative Example D and Examples 10-13.

| | Obs. angle/Ent. angle (degrees) | | | | | | |
|---|---|---|---|---|---|---|---|
| | 0.2/−4 | | | | 1/−4 | | |
| | Initial $R_A$ (cd/lux · m²) | Coated $R_A$ (cd/lux · m²) | Laminated $R_A$ (cd/lux · m²) | Retroreflectivity Retention (%) | Initial $R_A$ (cd/lux · m²) | Coated $R_A$ (cd/lux · m²) | Laminated $R_A$ (cd/lux · m²) |
| Comp. Ex. D | 99 | 99 | 0.4 | 0.4 | 63 | 63 | 0.5 |
| Ex. 10 | 158 | 173 | 1.6 | 1.0 | 70 | 71 | 0.6 |
| Ex. 11 | 115 | 128 | 2.6 | 2.3 | 64 | 63 | 1.0 |
| Ex. 12 | 113 | 54 | 37 | 33.1 | 61 | 46 | 23 |
| Ex. 13 | 145 | 63 | 51 | 35.3 | 70 | 59 | 41 |

| | Obs. angle/Ent. angle (degrees) | | | | |
|---|---|---|---|---|---|
| | 1/−4 | 2/−4 | | | |
| | Retroreflectivity Retention (%) | Initial $R_A$ (cd/lux · m²) | Coated $R_A$ (cd/lux · m²) | Laminated $R_A$ (cd/lux · m²) | Retroreflectivity Retention (%) |
| Comp. Ex. D | 0.8 | 29 | 29 | 0.6 | 2.2 |
| Ex. 10 | 0.9 | 24 | 16 | 0.6 | 2.5 |
| Ex. 11 | 1.5 | 29 | 16 | 1.0 | 3.4 |
| Ex. 12 | 37.5 | 30 | 24 | 11 | 37.2 |
| Ex. 13 | 58.6 | 25 | 14 | 12 | 50.3 |

Coating Solution 17:

In a 2 liter three-neck flask, equipped with a condenser and a thermometer, 960 grams of a 15.6% elongated silica dispersion in isopropyl alcohol (commercially available under the trade designation "IPA-ST-Up", from Nissan Chemical The UV-LED bank included a rectangular array of 352 UV-LEDs, 16 down-web by 22 cross-web (approximately covering a 20.3 cm×20.3 cm area). The UV-LEDs were placed on two water-cooled heat sinks. The LEDs (available from Cree, Inc., Durham N.C.) operated at a nominal wavelength of 395 nm, and were run at 45 Volts at 13 Amps. The UV-LED array was powered and fan-cooled by a TENMA 72 6910 (42V/10 A) power supply (available from Tenma, Springboro Ohio). The UV-LEDs were positioned above the cure chamber quartz window at a distance of approximately 2.54 cm from the substrate. The UV-LED cure chamber was supplied with a flow of nitrogen at a flow rate of 46.7 liters/min (100 cubic feet per hour) resulting in an oxygen concentration of approximately 150 ppm in the cure chamber.

After being polymerized by the UV-LEDs, the solvent in the cured coating was removed by transporting the coating to a drying oven operating at 150° F. for 2 minutes at a web speed of 5 ft/min. Next, the dried coating was post-cured using a Fusion System Model I300P configured with an H-bulb (available from Fusion UV Systems, Gaithersburg Md.). The UV Fusion chamber was supplied with a flow of nitrogen that resulted in an oxygen concentration of approximately 50 ppm in the chamber.

Comparative Example E was prepared as described in Comparative Example D, but in a different production run.

Retroreflectivity of Example 14 was measured at an observation angle of 0.2, entrance angle of −4, and 0 and 90 degrees orientation, and is shown in Table VIX, below.

TABLE VIX

Coefficient of Retroreflection $R_A$ and Retroreflectivity Retention for Comparative

| | Retroreflectivity (cd/lux · m$^2$) Orientation (degrees) | |
|---|---|---|
| | 0 | 90 |
| Comparative Example E | 46 | 48 |
| Example 14 | 32 | 31 |

It will be apparent to one of ordinary skill in the art that the area covered by the low refractive index composition could be varied by utilizing a different pattern such as, for example, a pattern with differently size dots, more closely spaced dots, or shapes other than dots.

As used herein, terms such as "vertical," "horizontal," "above," "below," "left," "right," "upper," "lower," "clockwise," "counter clockwise," and other similar terms refer to relative positions as shown in the figures. In general, a physical embodiment can have a different orientation, and in that case, the terms are intended to refer to relative positions modified to the actual orientation of the device. For example, even if retroreflective article 900 in FIG. 1A is flipped as compared to the orientation in the figure, major surface 923 is still considered to be a "top" major surface.

All patents, patent applications, and other publications cited above are incorporated by reference into this document as if reproduced in full. While specific examples of the disclosure are described in detail above to facilitate explanation of various aspects of the disclosure, it should be understood that the intention is not to limit the disclosure to the specifics of the examples. Rather, the intention is to cover all modifications, embodiments, and alternatives falling within the spirit and scope of the disclosure as defined by the appended claims.

What is claimed is:

1. A retroreflective article, comprising:
   a retroreflective layer including a first major surface that is structured and an opposed second major surface; and
   a low refractive index layer on at least a portion of the structured major surface, the low refractive index layer including a plurality of voids.

2. The retroreflective article of claim 1, wherein the structured major surface includes a plurality of optical elements that each have an optical element tip and the low refractive index layer is adjacent to at least some of the optical element tips.

3. The retroreflective article of claim 1, wherein the low refractive index layer includes a binder and a plurality of particles, and a plurality of voids.

4. The retroreflective article of claim 3, wherein the particles are metal oxide particles and the binder to metal oxide particle ratio is less than 1:1.

5. The retroreflective article of claim 4, wherein the binder to metal oxide particle ratio is between about 1:2 and about 1:8.

6. The retroreflective article of claim 3, wherein the particle to binder ratio is greater than 1:1.

7. The retroreflective article of claim 1, wherein the low refractive index layer conforms to at least a portion of the structured major surface.

8. The retroreflective article of claim 1, wherein the low refractive index layer planarizes the structured major surface.

9. The retroreflective article of claim 1, wherein the low refractive index layer is adjacent to the structured major surface to form a pattern.

10. The retroreflective article of claim 1, wherein the retroreflective article exhibits a total light return that is not less than about 5% for incident visible light at an entrance angle of −4 degrees.

11. The retroreflective article of claim 1, wherein the retroreflective article exhibits a coefficient of retroreflection $R_A$ that is not less than about 40 cd/(lux·m$^2$) for an observation angle of 0.2 degrees and an entrance angle of −4 degrees.

12. The retroreflective article of claim 1, wherein the low refractive index layer includes fumed silica.

13. The retroreflective article of claim 1, wherein the low refractive index layer has a BET porosity of between about 55% and about 80%.

14. The retroreflective article of claim 1, wherein the particles are metal oxide particles and the binder to metal oxide particle ratio is less than 1:1.

15. The retroreflective article of claim 1, wherein the particle to binder ratio is greater than 1:1.

16. The retroreflective article of claim 1, further including a metal substrate adjacent to the opposed second major surface of the retroreflective layer.

* * * * *